(12) United States Patent
Picerno et al.

(10) Patent No.: US 8,261,625 B2
(45) Date of Patent: Sep. 11, 2012

(54) STEPPER ACTUATOR HAVING A BREAKING MECHANISM

(75) Inventors: Michele Picerno, Bergamo (IT); Flavio Tondolo, Stezzano BG (IT)

(73) Assignee: STI srl (IT)

(*) Notice: Subject to any disclaimer, the term of this patent is extended or adjusted under 35 U.S.C. 154(b) by 1121 days.

(21) Appl. No.: 12/122,955

(22) Filed: May 19, 2008

(65) Prior Publication Data
US 2009/0282937 A1 Nov. 19, 2009

(51) Int. Cl.
*F16H 57/10* (2006.01)
(52) U.S. Cl. .......... 74/411.5; 251/284; 310/77; 310/93; 137/355.21
(58) Field of Classification Search ............... 74/411.5; 251/129.13, 284; 310/76, 77, 93, 123; 137/15.23, 137/15.25, 355.21, 384.8
See application file for complete search history.

(56) References Cited

U.S. PATENT DOCUMENTS

| | | | |
|---|---|---|---|
| 1,126,084 A | 1/1915 | Reisbach | |
| 2,684,597 A | 7/1954 | Binks | |
| 2,829,530 A | 3/1955 | Holden | |
| 2,715,840 A | 8/1955 | Binks et al. | |
| 2,947,317 A | 8/1960 | Towler et al. | |
| 3,191,080 A * | 6/1965 | Edwards | 310/118 |
| 3,488,533 A * | 1/1970 | Pope | 310/76 |
| 4,050,298 A * | 9/1977 | Hope et al. | 73/121 |
| 4,180,238 A | 12/1979 | Muchow | |
| 4,403,523 A * | 9/1983 | Seger | 74/128 |
| 4,771,807 A | 9/1988 | Karani | |
| 5,020,383 A | 6/1991 | Kanaya | |
| 5,168,200 A * | 12/1992 | Payne | 318/282 |
| 5,758,684 A * | 6/1998 | Hudson et al. | 137/269 |
| 5,970,997 A * | 10/1999 | Hudson et al. | 137/1 |
| 5,988,319 A * | 11/1999 | Hudson et al. | 185/40 R |
| 5,996,687 A * | 12/1999 | Pringle et al. | 166/66.6 |
| 7,665,483 B1 * | 2/2010 | Sid | 137/625.47 |
| 7,827,796 B2 * | 11/2010 | Jones et al. | 60/734 |

\* cited by examiner

*Primary Examiner* — David M Fenstermacher
(74) *Attorney, Agent, or Firm* — Stetina Brunda Garred & Brucker

(57) ABSTRACT

A stepper actuator including a brake drum and a central gear mechanically connected thereto. The brake drum and the central gear are selectively rotatable in opposing first and second rotational directions. First and second actuation members are moveable through first and second actuation cycles to incrementally rotate the central gear. The actuation members engage and subsequently disengage the central gear as they move through their actuation cycles. The actuation members are configured to rotate the central gear during engagement therewith. A braking assembly is operatively connected to the first and second actuation members and is frictionally engaged to the brake drum to prevent rotation of the brake drum when the first and second actuation members are each in a retracted position as occurs when neither is moving through a corresponding actuation cycle. The braking assembly disengages the brake drum when one of the actuation members is moved from its retracted position and into its actuation cycle as facilitates the incremental rotation of the central gear.

19 Claims, 14 Drawing Sheets

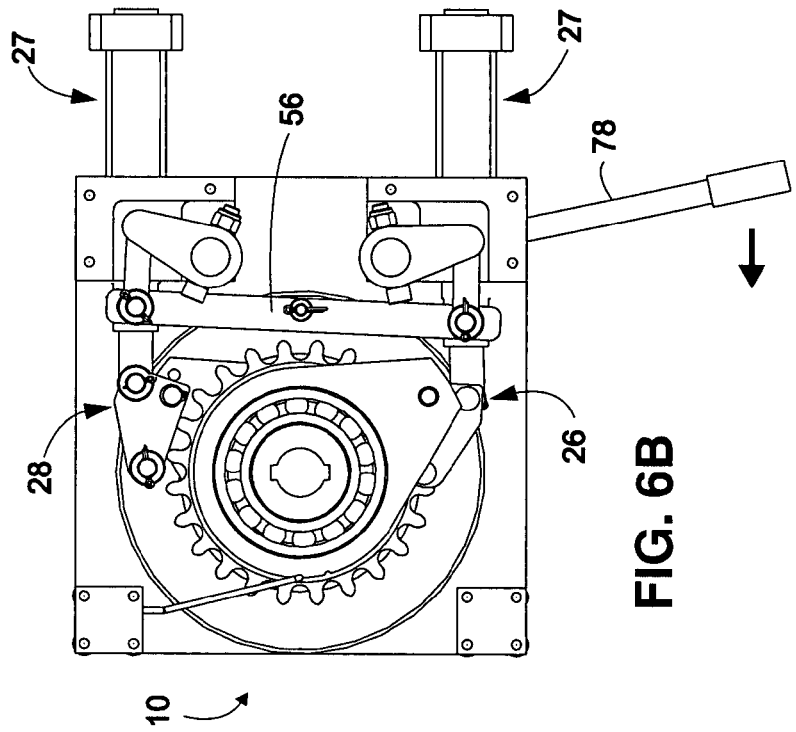
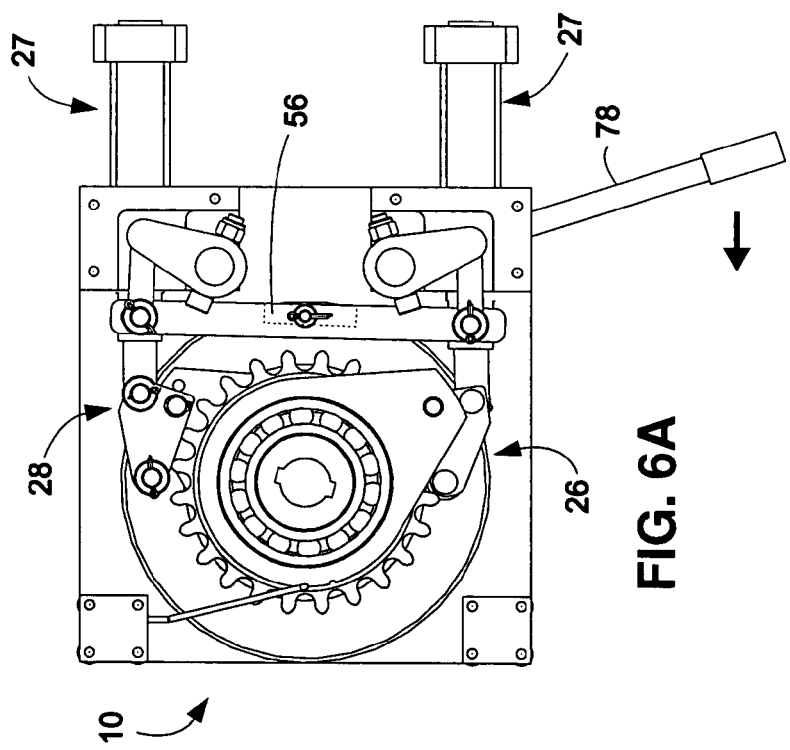

STEPPER ACTUATOR HAVING A BREAKING MECHANISM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to positioning control systems and more particularly to a stepper actuator having a braking element configured to apply a braking force to mitigate unwanted rotation of the stepper actuator.

2. Description of the Prior Art

A positioning control system may be used in applications requiring accurate and precise regulation over the position of a given element. For instance, it may be desirable to have precise and accurate regulation over a control valve in a flow line carrying fluid at high pressure. Exemplary of such high pressure flow lines include the flow of gas or oil from a well, or the flow of high pressure steam to and from a turbine within a power plant. In an exemplary application, the control valve may be used to maintain the downstream pressure of the fluid in the flow line at safe and manageable levels.

Although precise regulation over a control valve in a high pressure fluid flow line may be desirable, it is often difficult to achieve. For instance, in certain applications, it is difficult to generate a sufficient amount of force to overcome the high pressure in the flow line to move the control valve at prescribed, accurate increments between its open and closed positions. In this regard, precise and accurate control over the fluid in the flow line may require small, incremental movements of the control valve, which is typically more difficult at high pressure.

To address this particular need, it is know in the prior art to employ the use of a hydraulic or pneumatic stepper actuator to achieve more precise and accurate positioning control over a fluid control valve. Known stepper actuators typically include a drive shaft which is adapted to be rotated in small increments. The rotation of the drive shaft corresponds to the incremental opening or closing of the control valve. In the prior art stepper actuators, the drive shaft is usually rotated by pneumatic or hydraulic actuation members. In certain prior art stepper actuators, the actuation members are mechanically connected to the drive shaft via a gear. The gear may be incrementally rotated by the actuation members through repeated engagement and disengagement of the actuation members to the gear, as needed to achieve incremental opening or closing of the fluid control valve. In this manner, the fluid control valve may be incrementally opened or closed to achieve desired flow parameters.

Once the fluid control valve is in the desired position, the actuation members of the prior art actuators are often disengaged from the gear. In this regard, one of the primary drawbacks of known stepper actuators is that upon such disengagement, forces are able to act on the drive shaft in a manner resulting in undesirable rotation thereof. As will be recognized, such rotation of the drive shaft, even in a small amount, may cause the fluid control valve to move from its desired position. For instance, vibration of the fluid control system may cause the drive shaft to rotate. As indicated above, such unwanted rotation of the drive shaft may compromise the precise control over the flow of fluid through the flow line.

Thus, there exists a need in the art for a stepper actuator having a braking mechanism configured to mitigate or prevent unwanted rotation of the stepper actuator, and in particular the drive shaft extending therethrough, upon the disengagement of the actuation members from the internal drive shaft rotational assembly (e.g., a gear) of the stepper actuator. The present invention addresses this particular need and others, as will be discussed in more detail below.

BRIEF SUMMARY OF THE INVENTION

The present invention specifically addresses and alleviates the above-referenced deficiencies associated with stepper actuators of the prior art. More particularly, the present invention comprises a stepper actuator which, in one embodiment, includes a brake drum and a central gear having a plurality of gear teeth. The central gear is mechanically connected to the brake drum. The brake drum and the central gear are concurrently rotatable in either first (clockwise) or second (counter-clockwise) rotational directions.

The stepper actuator also includes a first actuation member that is moveable through a first actuation cycle. The first actuation member initiates the first actuation cycle from a retracted position. The first actuation member initially engages the central gear teeth and subsequently disengages the central gear teeth as the first actuation member moves through the first actuation cycle and returns to the retracted position. The first actuation member is sized and configured to rotate the central gear at a first prescribed angular displacement in the first rotational direction during engagement with the central gear teeth. The stepper actuator also includes a second actuation member that is moveable through a second actuation cycle. The second actuation member initiates the second actuation cycle from a retracted position. The second actuation member initially engages the central gear teeth and subsequently disengages the central gear teeth as the second actuation member moves through the second actuation cycle and returns to the retracted position. The second actuation member is sized and configured to rotate the central gear at a second prescribed angular displacement in the second rotational direction during engagement with the central gear teeth.

A braking assembly is operatively connected to the first and second actuation members. The braking assembly engages the brake drum to mitigate or prevent rotation of the brake drum when the first and second actuation members are both in their respective retracted positions. The braking assembly disengages the brake drum when one of the first or second actuation members is moved from its retracted position and into its corresponding actuation cycle.

The brake drum defines a peripheral brake drum wall. The brake drum wall in turn defines an inner contact surface. The braking assembly is brought into abutting, frictional engagement to the inner contact surface of the brake drum wall when the first and second actuation members are both in their retracted positions. The braking assembly disengages from the inner contact surface of the brake drum wall when one of the first or second actuation members is moved from its respective retracted position into its actuation cycle. The braking assembly may define an arcuate braking surface that is frictionally engageable with the inner contact surface of the brake drum to mitigate rotation thereof.

The braking assembly may include a brake pad which is connected to an elongate brake link. The elongate brake link may define opposed first and second end portions. The first end portion may be pivotally connected to the first actuation member and the second end portion may be pivotally connected to the second actuation member. The brake link may be in a primary position when the first and second actuation members are both in their respective retracted positions. The brake pad may engage the brake drum to mitigate rotation of the brake drum when the brake link is in the primary position. The brake pad may disengage from the brake drum when the brake link is moved from the primary position, as occurs when either of the first and second actuation members is moved from its fully retracted position into its actuation cycle.

The stepper actuator may be configured to enable manual control or actuation of either of the first and second actuation members. The stepper actuator may include a manual actuation lever that may be mechanically connected to one of the first and second actuation members, and is pivotable about a corresponding axis. As a result, one of the first and second actuation members may be moveable through a respective one of the first and second actuation cycles by the manual actuation lever.

The stepper actuator of the present invention may be configured to apply a braking force to the brake drum to mitigate rotation of the central gear, and hence a drive shaft extending therethrough, when the first and second actuation members are each in their retracted positions. The stepper actuator may further be configured discontinue the application of such braking force when one of the first and second actuation members is engaged with the gear teeth of the central gear. In this manner, the actuation members do not have to overcome the frictional braking force applied by the brake pad to the brake drum wall of the brake drum as they rotate the central gear. In addition, as indicated above, the stepper actuator of the present invention may be configured to facilitate the manual actuation of either the first or second actuation members.

Further in accordance with the present invention, there is provided alternative embodiments of the stepper actuator which are outfitted with braking mechanisms differing from the above-described brake drum and corresponding braking assembly comprising the brake pad and brake link. More particularly, in one alternative embodiment of the present invention, the brake drum, brake pad and brake link are eliminated in favor of a rigid half collar that is frictionally engageable to an integral, cylindrical neck of the central gear when the first and second actuation members are each in the retracted position. In accordance with another alternative embodiment of the present invention, the aforementioned rigid half collar is substituted with a flexible belt that is operative to exert a frictional braking force on the neck of the central gear when the first and second actuators are each in the retracted position.

In accordance with a further alternative embodiment of the present invention, the brake drum, brake pad and brake link may be eliminated in favor of an elongate locking bar that is radially moveable relative to the axis of the central gear, and is operative to push against and apply a braking force to the neck thereof when moved to a braking position as a result of the movement of one of the first and second actuation members out of its retracted position. Finally, in accordance with yet another alternative embodiment of the present invention, the radially movable locking bar may be substitute with one that moves along a different path and is cooperatively engaged to the first and second actuators so as to be advanceable between adjacent teeth of the central gear when both the first and second actuation members reside in their fully retracted positions.

The present invention is best understood by reference to the following detailed description when read in conjunction with the accompanying drawings.

BRIEF DESCRIPTION OF THE DRAWINGS

These as well as other features and advantages of the various embodiments disclosed herein will be better understood with respect to the following description and drawings, in which like numbers refer to like parts throughout, and in which:

FIGS. 6A-6F are top plan views of the stepper actuator of the first embodiment depicting the incremental rotation of the central gear thereof;

DETAILED DESCRIPTION OF THE INVENTION

Figure 1:
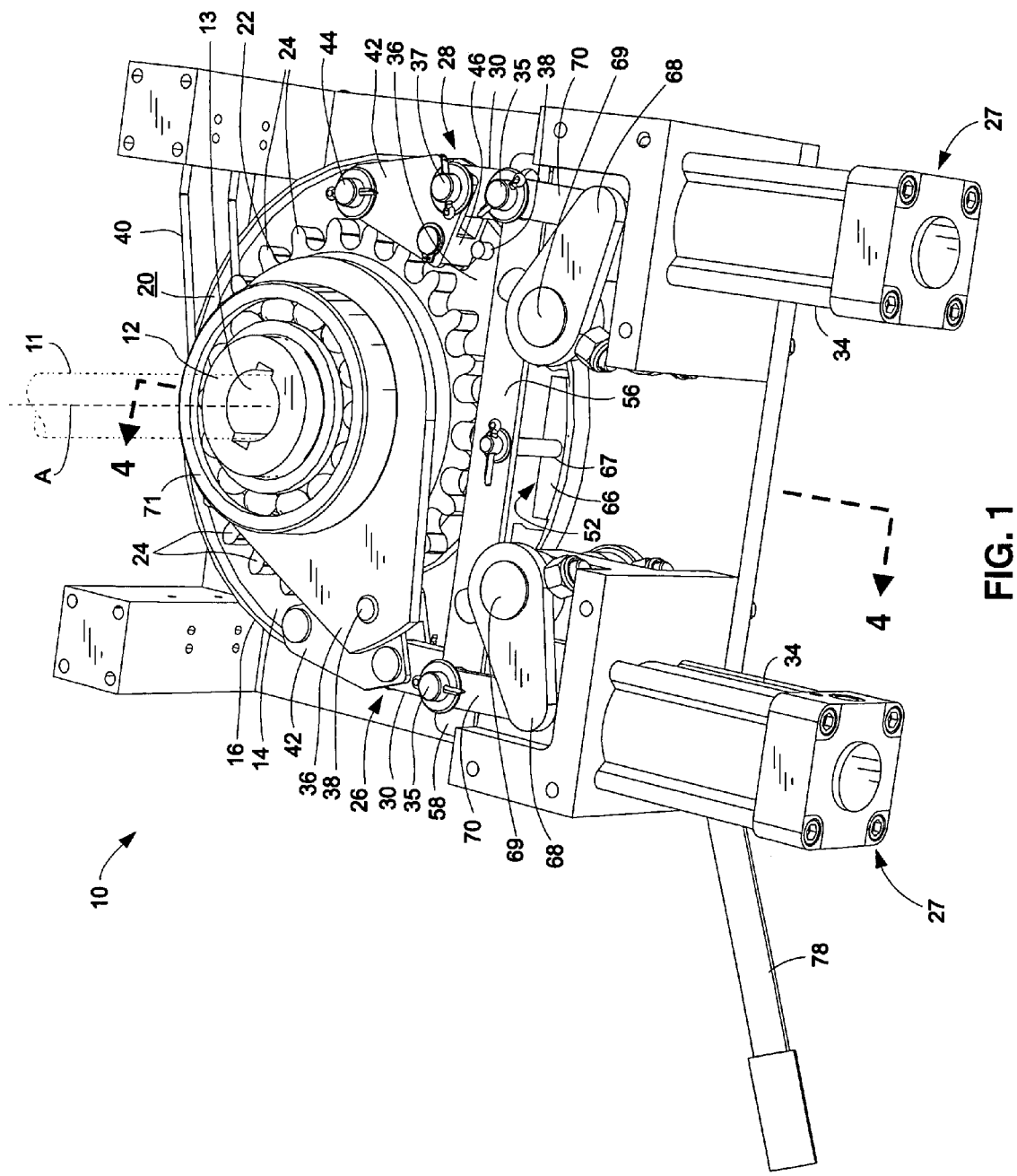
FIG. 1 is a top perspective view of a stepper actuator constructed in accordance with a first embodiment of the present invention and having a central gear, a brake drum and a braking assembly configured to apply a braking force to mitigate unwanted rotation of the central gear, the braking assembly being shown in an engaged position.

Referring now to the drawings wherein the showings are for purposes of illustrating a preferred embodiment of the present invention only, and not for purposes of limiting the same, FIGS. 1-7 depict a stepper actuator 10 constructed in accordance with a first embodiment of the present invention.

The stepper actuator 10 is adapted to facilitate the incremental rotation of a drive shaft 11 which does not comprise part of the stepper actuator 10, and is shown in phantom in FIG. 1. Though not shown, the drive shaft 11 is in turn mechanically coupled to the flow control element of a flow control valve which is disposed within a high pressure fluid flow line. Along these lines, the rotation of the drive shaft 11 in either a clockwise or counter-clockwise direction is typically used to facilitate the rotation of the flow control element of the flow control valve between fully open and closed positions, as well as any partially open position between the fully open and closed positions. In this regard, the incremental rotation of the drive shaft 11 by the stepper actuator 10 (and hence the flow control element of the flow control valve) in a manner which will be described in more detail below enables precise control over the flow of fluid through the high pressure flow line.

Figure 2:
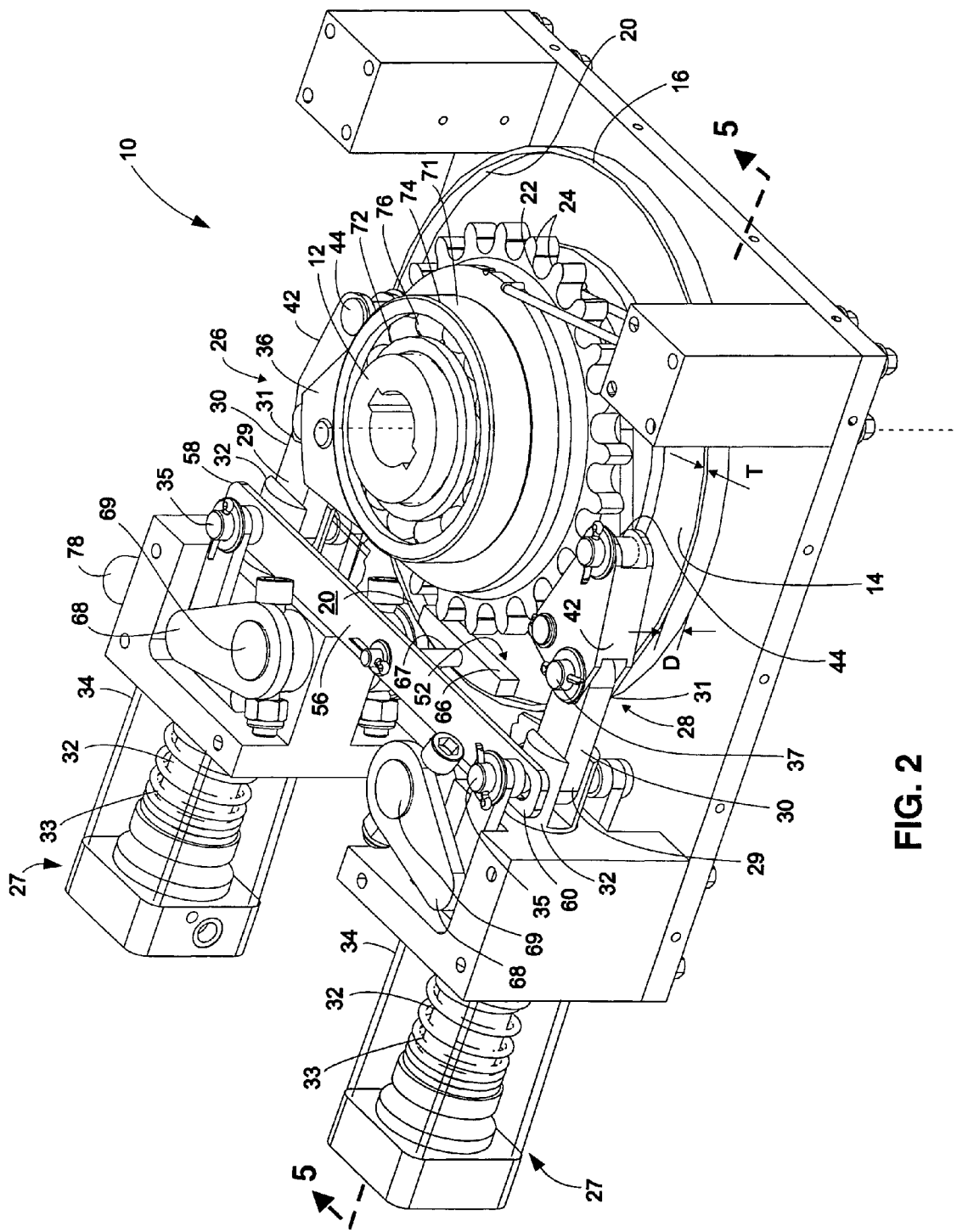
FIG. 2 is another top perspective view of the stepper actuator shown in FIG. 1, illustrating the braking assembly thereof in an engaged position.
Figure 3:
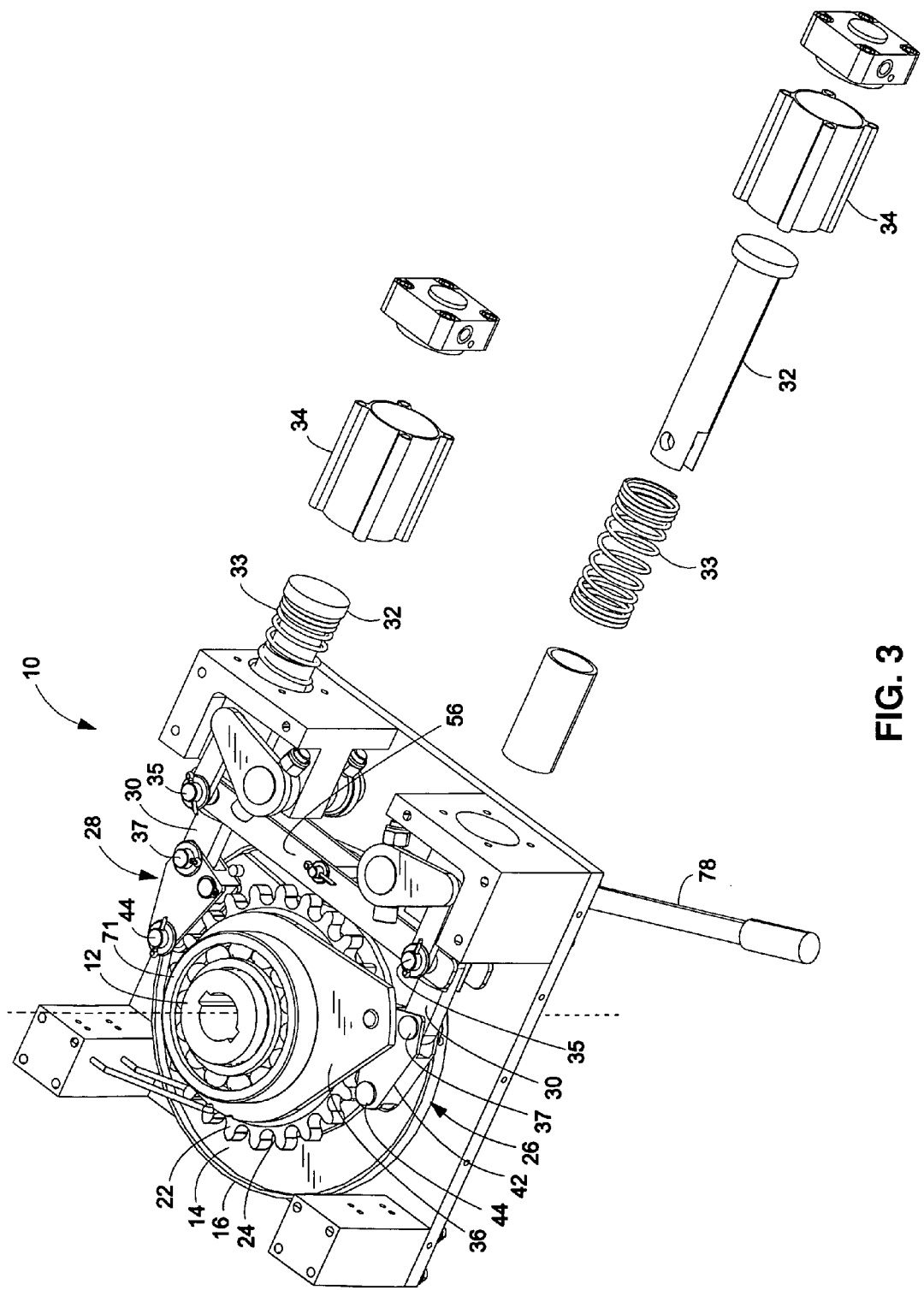
FIG. 3 is a top perspective, partially exploded view of the stepper actuator shown FIGS. 1 and 2, further illustrating an optional manual actuation lever of the stepper actuator.
Figure 4:
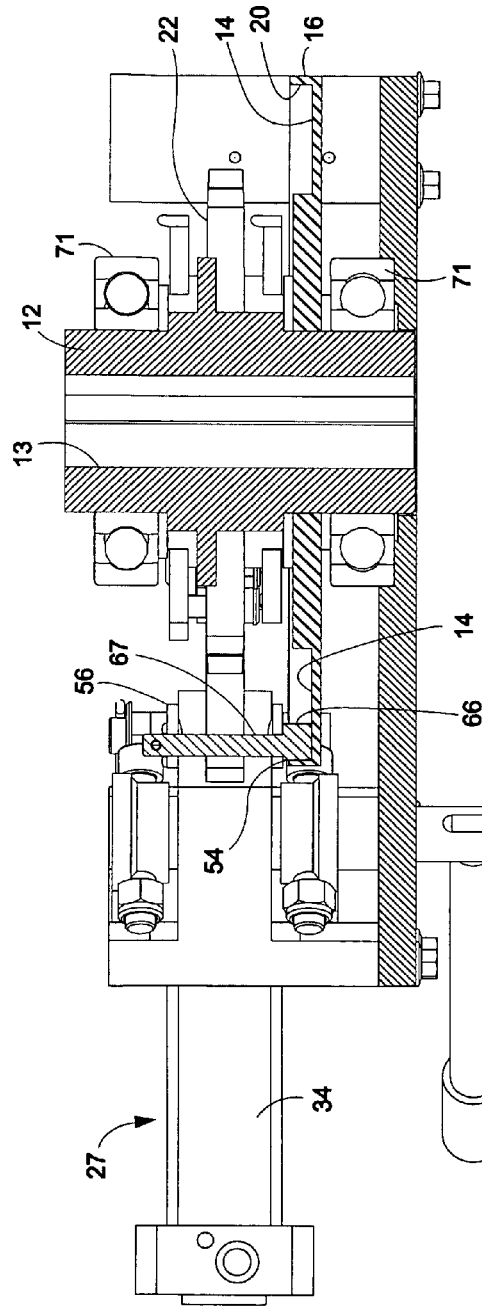
FIG. 4 is a cross-sectional view of the stepper actuator taken along line 4-4 of FIG. 1.
Figure 5:
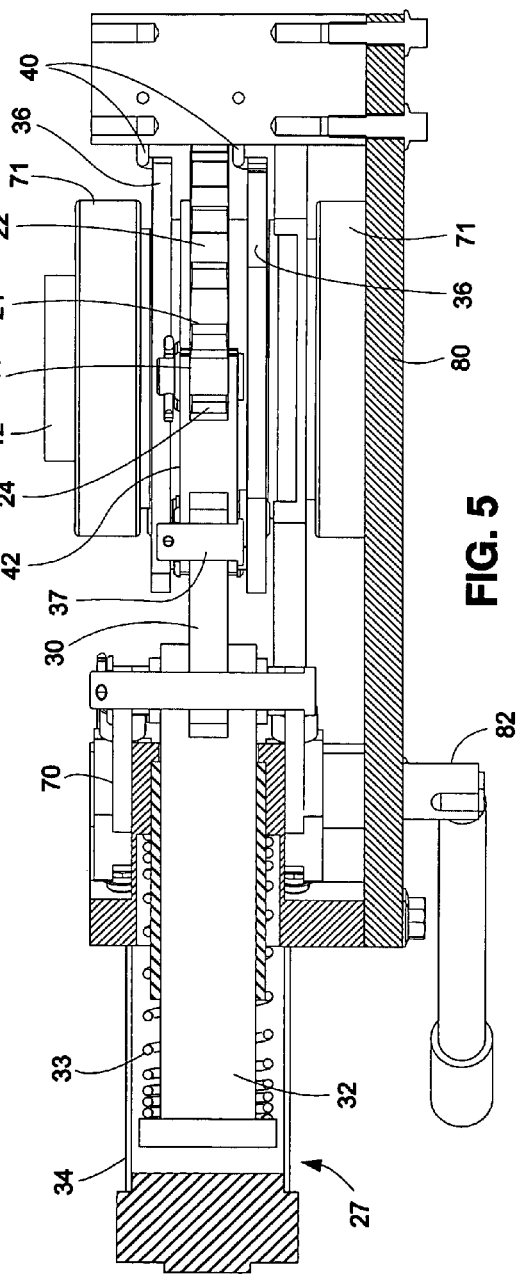
FIG. 5 is a cross-sectional view of the stepper actuator taken along line 5-5 of FIG. 2.
Figure 6D:
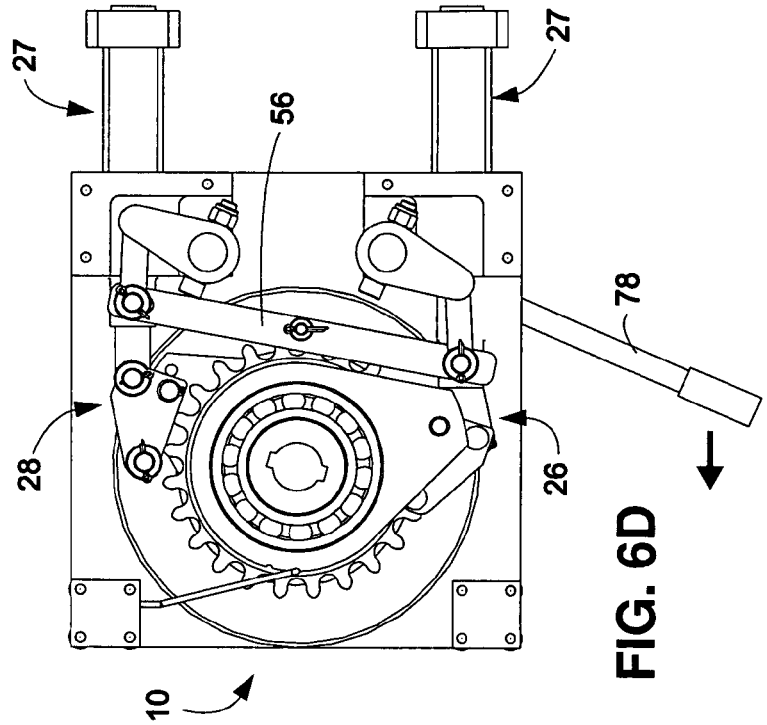
Figure 6C:
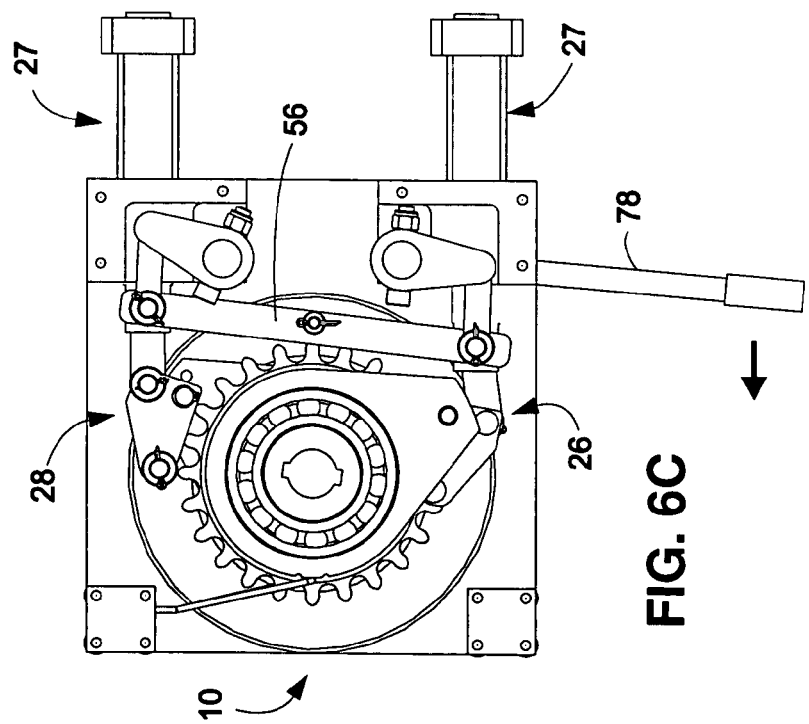
Figure 6F:
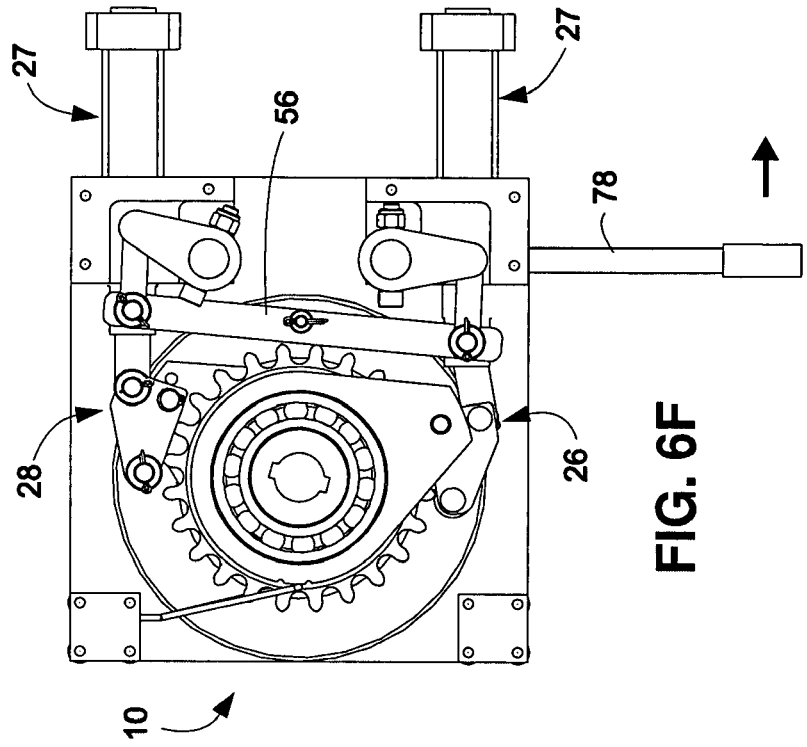
Figure 6E:
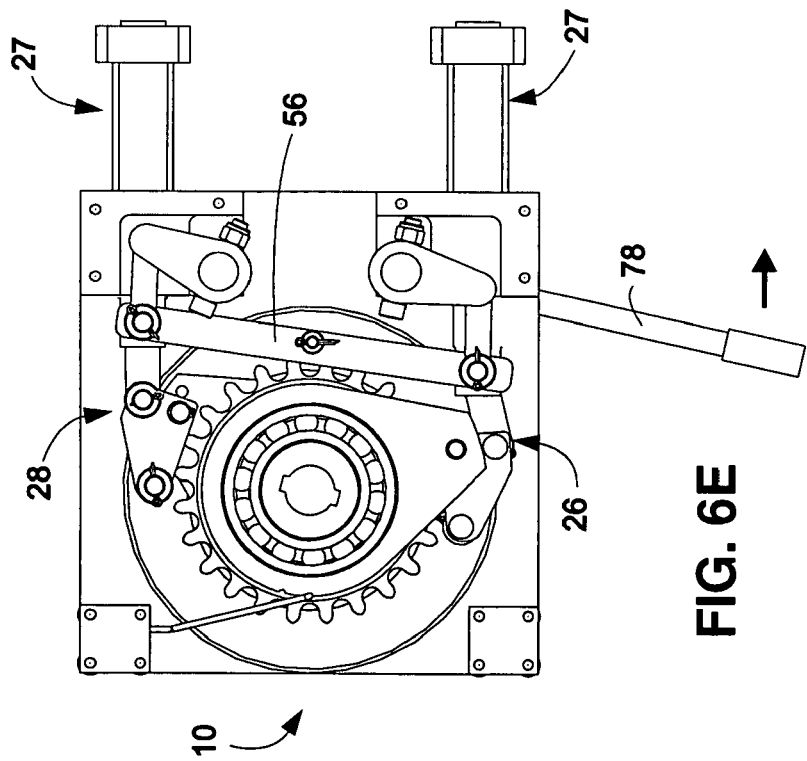
Figure 7:
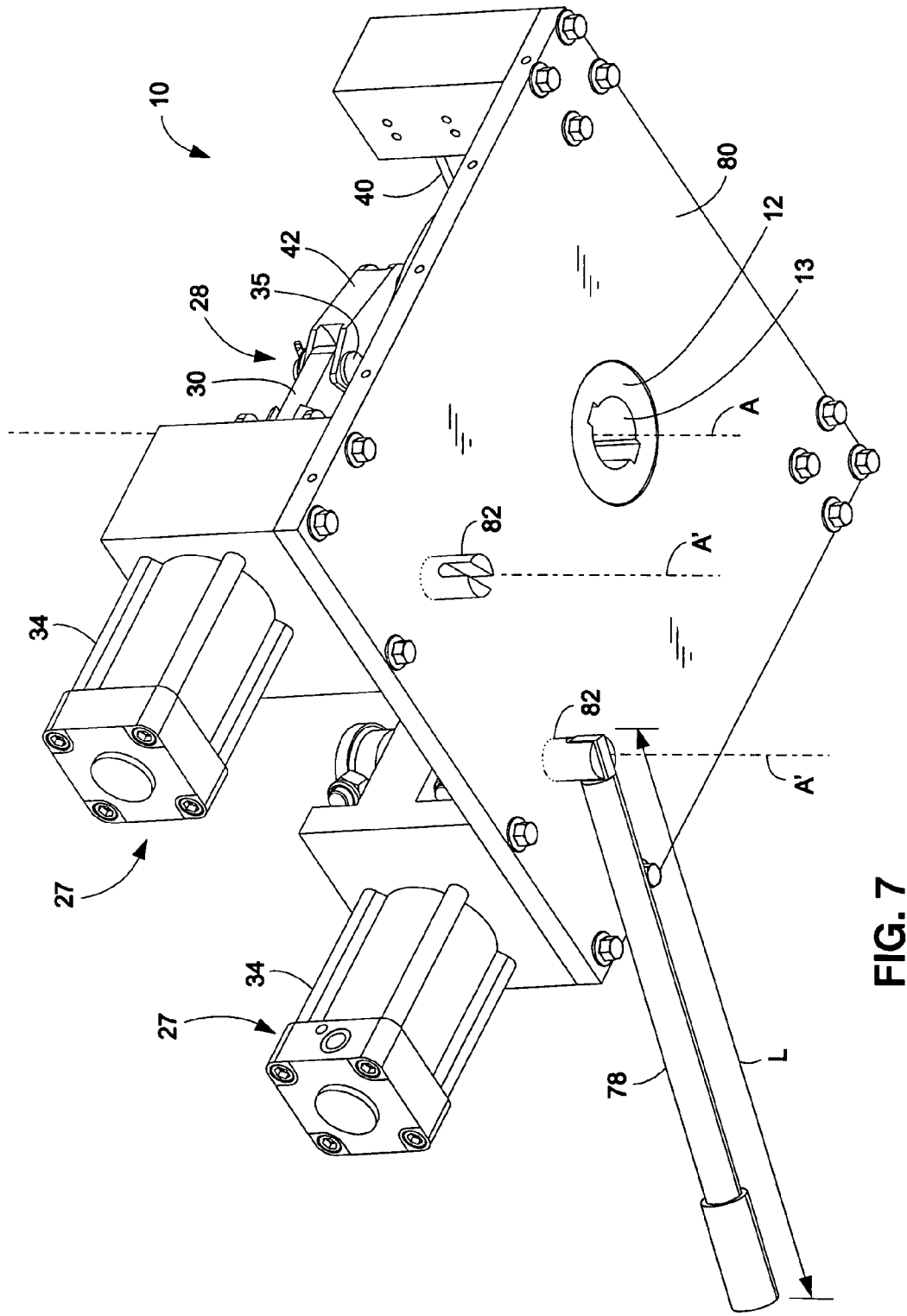
FIG. 7 is a bottom perspective view of the stepper actuator of the first embodiment, also depicting an optional manual actuation lever which may be used in conjunction with the stepper actuator.

In the stepper actuator 10, the drive shaft 11 is advanced through and mechanically connected to a cylindrically configured central hub 12 of the stepper actuator 10. As seen in FIGS. 1-4, the central hub 12 has a bore 13 extending axially therethrough. The drive shaft 11 is advanceable through the bore 13 of the central hub 12. As also seen in FIGS. 1-3, the bore 13 of the central hub 12 is preferably formed to define opposed keyways which are adapted to receive corresponding keys fitted within the drive shaft 11. The receipt of these keys into respective ones of the keyways ensures that the central hub 12 and the drive shaft 11 will always rotate concurrently with each other.

In the stepper actuator 10, the central hub 12 is mechanically connected to a central gear 22. The mechanical connection between the central hub 12 and the central gear 22 is such that they rotate concurrently with each other. Thus, as the central gear 22 rotates, the central hub 12 and hence the drive shaft 11 also rotate. The central gear 22 defines a plurality of gear teeth 24 which are disposed about the periphery thereof. As will be recognized by those of ordinary skill in the art, the number of gear teeth 24 included on the central gear 12, as well as the size of such gear teeth 24, may be varied from that shown in FIGS. 1-3. In the stepper actuator 10, the central gear 22 has a gear diameter defined by the outer circumference of the gear teeth 24. Those of ordinary skill in the art will recognize that the central hub 12 may comprise an integral portion of the central gear 22, such as a reduced diameter neck thereof.

The central gear 22 of the stepper actuator 10 is selectively rotatable in either a first (clockwise) direction or a second (counter-clockwise) direction. The incremental rotation of the central gear 22 in either the first or second directions is facilitated by first and second actuation members 26, 28 of the stepper actuator 10. In this regard, the first and second actuation members 26, 28 are adapted to separately engage the central gear 22, and to incrementally rotate the central gear 22 in either the first or second directions. More particularly, the rotation of the central gear 22 in the first, clockwise direction is facilitated by the engagement of the first actuation member 26 with the central gear 22. Upon the engagement of the first actuation member 26 to the central gear 22, the second actuation member 28 is necessarily disengaged therefrom. Conversely, the rotation of the central gear 22 in the second, counter-clockwise direction is facilitated by the engagement of the second actuation member 28 to the central gear 22. When the second actuation member 28 is engaged to the central gear 22, the first actuation member 26 is necessarily disengaged therefrom. As will be discussed in more detail below, it is contemplated that the first and second actuation members 26, 28 may each be either hydraulically or pneumatically actuated.

In the stepper actuator 10, it is contemplated that the first and second actuation members 26, 28 will normally be operated under automatic control. In this regard, though not shown, the stepper actuator 10 may be used in conjunction with a complimentary control unit which is operative to automatically control the rotation of the central gear 22, and hence the drive shaft 11, by the selective actuation of the first and second actuation members 26, 28. Along these lines, a user may input a desired setting into the control unit, with the stepper actuator 10 then being operative to facilitate the rotation of the central gear 22 in either a clockwise or counter-clockwise direction until the desired setting is achieved. As will be recognized by those of ordinary skill in the art, the desired setting may correspond to desired flow parameters of fluid flowing within the flow line accommodating the flow control valve to which the drive shaft 11 is operatively coupled. The stepper actuator 10 may also be manually controlled, as will also be described in more detail below.

As indicated above, the central gear 22 of the stepper actuator 10 is incrementally rotated in either the first or second directions by the first and second actuation members 26, 28. In the stepper actuator 10, the first actuation member 26 is moveable relative to the central gear 22 through a first actuation cycle. Such first actuation cycle is initiated when the first actuation member 26 is in its retracted position, as shown in FIGS. 1-3. Similarly, the second actuation member 28 is moveable relative to the central gear 22 through a second actuation cycle which is also initiated when the second actuation member 26 is in its retracted position, as also shown in FIGS. 1-3. As the first actuation member 26 moves through its first actuation cycle, it engages the central gear teeth 24 of the central gear 22, incrementally rotates the central gear 22 through a prescribed angular displacement, and subsequently disengages the gear teeth 24 before returning to its retracted position. In a similar manner, when the second actuation member 28 moves through the second actuation cycle, the second actuation member moves from its initial retracted position, engages the gear teeth 24 of the central gear 22, incrementally rotates the central gear 22 through a prescribed angular displacement, disengages the gear teeth 24 of the central gear 22, and thereafter returns to its retracted position. It is contemplated that the amount of incremental rotation effectuated by the first and second actuation members 26, 28 may be substantially similar. In other words, the stepper actuator 10 may be configured to rotate the central gear 22 at a prescribed angular increment in either the first or second directions. However, it will also be recognized by those of ordinary skill in the art that the incremental rotation effectuated by the first actuation member 26 may differ from the incremental rotation effectuated by the second actuation member 28.

In the stepper actuator 10, the first actuation member 26 is moved through the first actuation cycle and the second actuation member 28 through the second actuation cycle by respective ones of an identically configured pair of actuators 27. As best seen in FIGS. 1-3, each of the actuators 27 comprises a housing 34 having an elongate, generally cylindrical actuation rod 32 partially disposed therein and protruding from one end thereof. The actuation rod 32 is normally maintained in a retracted position within the corresponding housing 34 as a result of the biasing force applied thereto by a biasing member 33. In each actuator 27, the biasing member 33 comprises a helical spring, though other biasing members known by those skilled in the art may be used as an alternative to such helical spring. In each actuator 27, the application of fluid (e.g., pneumatic or hydraulic) pressure to the piston formed on one end of the actuation rod 32 is operative to overcome the biasing force exerted by the biasing member 33, and thus facilitate the movement of the actuation rod 32 from its retracted position relative to the housing 34, to an extended position relative such housing 34. Though of ordinary skill in the art will recognize that the single acting actuators 27 may be substituted with double acting actuators wherein pneumatic or hydraulic fluid pressure is used to stroke the actuation rod between its extended and retracted positions.

The first and second actuation members 26, 28 of the stepper actuator 10 are identically configured, and each comprise an actuation link 30 defining opposed end portions 29, 31. As best seen in FIG. 2, the end portions 29 of the actuation links 30 of the first and second actuation members 26, 28 are pivotally connected to respective ones of the actuation rods 32 of the actuators 27. In this regard, the end of each actuation rod 32 opposite the end defining the piston includes a juxtaposed pair of ear portions defining an intermediate gap which is sized and configured to accommodate the end portion 29 of a respective one of the actuation links 30. Disposed within the ear portions of each actuation rod 32 is a coaxially aligned pair of apertures which are adapted to be aligned with a corresponding aperture disposed within the end portion 29 of the corresponding actuation link 30 when such end portion 29 is advanced between the ear portions. Each actuation link 30 is pivotally connected to a respective one of the actuation rods 32 by the advancement of an elongate pin 35 through these coaxially aligned apertures. Each pin 35 is maintained in its operative position by the advancement of a cotter pin through the upper end portion thereof.

In addition to the actuation links 30, the first and second actuation members 26, 28 each include a pawl 42 which is pivotally connected to the end portion 31 of a respective one of the actuation links 30. The pivotal connection of each pawl 42 to a respective one of the actuation links 30 is preferably facilitated by the advancement of a pin 37 through coaxially aligned apertures within the pawl 42 and the actuation link 30. As best seen in FIGS. 1 and 2, each pin 37 is maintained in its operative position through the use of a corresponding cotter pin. In the stepper actuator 10, each pawl 42 further includes a contact pin 44 which is advanced through a coaxially aligned pair of apertures in the pawl 42 and maintained therein through the use of a cotter pin as well. The contact pin 44 of each pawl 42 is selectively engageable to the gear teeth 24 of the central gear 22. In this regard, the contact pin 44 of each pawl 42 is sized and configured to be slidably advanceable between any adjacent pair of gear teeth 24 defined by the central gear 22. As will be recognized by those of ordinary skill in the art, when the contact pin 44 of either pawl 42 is received between two consecutive gear teeth 24, the corresponding pawl 42 is operatively engaged to the central gear 22.

In the stepper actuator 10, each pawl 42 is adapted to be pivotally moveable between engaged and disengaged positions relative to a respective one of the actuation links 30. When either pawl 42 is in its engaged position, the contact pin 44 thereof is cooperatively engaged to the central gear 22 in the above-described manner. Conversely, when either pawl 42 is in its disengaged position, the contact pin 44 thereof is disengaged from the central gear 22. Each pawl 42 is pivotally moveable between its engaged and disengaged positions as the corresponding actuation member 26, 28 moves through its respective actuation cycle.

In the stepper actuator 10 of the present invention, it is contemplated that each pawl 42 will normally be biased towards its engaged position. Consequently, the stepper actuator 10 preferably includes a pair of actuation collars 36 which are configured to selectively pivot respective ones of the pawls 42 into the disengaged position. Only one of the actuation collars 36 is clearly shown in FIG. 1. Each actuation collar 36 includes an engagement pin 38, with the engagement pins 38 of both of the actuation collars 36 being shown in FIG. 1. In this regard, each of the pawls 42 defines an engagement portion 46 which is adapted to interact with a respective one of the engagement pins 38 of the actuation collars 36 in a manner which will be described in more detail below.

As indicated above, each actuation collar 36 is adapted to mechanically engage a respective one of the pawls 42 as it moves through its corresponding actuation cycle, thus causing such pawl 42 to be pivoted into its disengaged position. With regard to the first actuation member 26, after the contact pin 44 of the pawl 42 thereof facilitates an incremental rotational movement of the central gear 22 in the first, clockwise direction, the engagement pin 38 of the corresponding actuation collar 36 is adapted to act against the engagement portion 46 of the pawl 42 of the first actuation member 26 as effectively overcomes the biasing force acting on such pawl 42 to pivot the same into its disengaged position, thus allowing the first actuation member 26 to be moved back to its retracted position without interfering with the central gear 22. In the same manner, after the second actuation member 28 has been moved in a manner causing the contact pin 44 of the pawl 42 thereof to facilitate an incremental rotational movement of the central gear 22 in the second, counter-clockwise direction, the engagement pin 38 of the corresponding actuation collar 36 is adapted to act against the engagement portion 46 of the pawl 42 of the second actuation member 28 in a manner overcoming the biasing force acting thereon, thus pivoting such pawl 42 into its disengaged position as is needed to allow the second actuation member 28 to return to its retracted position without the pawl 42 thereof interfering with the central gear 22.

In the stepper actuator 10, each actuation collar 36 may be biased to rotate in the same direction as that of the corresponding pawl 42. In other words, for that pawl 42 of the first actuation member 26 which is adapted to rotate the central gear 22 in the first, clockwise direction, the corresponding actuation collar 36 is preferably also biased in the first direction. Similarly, for the pawl 42 of the second actuation member 28 which is adapted to rotate the central gear 22 in the second, counter-clockwise direction, the corresponding actuation collar 36 is preferably biased in the second direction as well. Along these lines, each actuation collar 36 may include a contact portion which is engageable to a respective one of a pair of stoppers 40, such stoppers 40 being operative to restrict the rotation of the corresponding actuation collar 36 in a direction opposite its desired direction. In other words, each actuation collar 36 is biased to place the contact portion thereof into engagement with a corresponding one of the stoppers 40.

In the stepper actuator 10, the actuation collars 36 are cooperatively engaged to respective ones of a pair of bearing members 71. The bearing members 71 are each cooperatively engaged to the central hub 12 and are adapted to allow respective ones of the actuation collars 36 to rotate independently of the central hub 12, and hence the central gear 22. As indicated above, the central gear 22 is also cooperatively engaged to the central hub 12 and, more particularly, is rigidly attached thereto so as to be concurrently rotatable therewith. Each of the bearing members 71 comprises annular inner and outer housings 72, 74 which are concentrically oriented relative to each other and include a plurality of ball bearings 76 captured therebetween.

FIGS. 6A-6F illustrate the progressive movement of the first actuation member 26 through its first actuation cycle. When the first actuation member 26 is in its retracted position, the engagement pin 38 of the corresponding actuation collar 36 is cooperatively engaged with the pawl 42 of the first actuation member 26, with the collar contact portion of such actuation collar 36 being disengaged from the corresponding stopper 40. As the first actuation member 26 moves from its retracted position, the corresponding actuation collar 36 rotates in its biased rotational direction until the contact portion thereof engages with the corresponding stopper 40. As the first actuation member 26 continues to move through the first actuation cycle, the pawl 42 of the first actuation member 26 becomes disengaged from the corresponding actuation collar 36, thereby allowing the pawl 42 of the first actuation member 26 to pivot to its engaged position and into direct engagement with the gear teeth 24 of the central gear 22 in the above-described manner.

With the contact pin 44 of the pawl 42 of the first actuation member 26 being cooperatively engaged to the central gear 22, the actuation rod 32 of the actuator 27 interfaced to the first actuation member 26 continues its advancement from the corresponding housing 34, which in turn allows the pawl 42 of the first actuation member 26 to incrementally rotate the central gear 22 through a prescribed angular displacement. The rotation of the central gear 22 by the first actuation member 26 ceases when the actuation rod 32 of the corresponding actuator 27 reaches the full extent of its outward stroke. Once this full outward stroke is reached, the central gear 22 stops rotating, with the an inward stroke of the actuation rod 32 then being initiated to facilitate the return the first actuation member 26 to its retracted position. More particularly, the initiation of the inward stroke of the actuation rod 32 interfaced to the first actuation member 26 causes the pawl 42 of the first actuation member 26 to contact the engagement pin 38 of the corresponding actuation collar 36, which in turn causes such pawl 42 to pivot to its disengaged position, thus releasing the contact pin 44 thereof from between an adjacent pair of gear teeth 24 of the central gear 22. With the pawl 42 of the first actuation member 26 being disengaged from the central gear 22, the first actuation member 26 returns to its retracted position, which corresponds to the full inward stroke of the actuation rod 32 of the corresponding actuator 27.

As will be recognized by those of ordinary skill in the art, the above-mentioned cycle or sequence may be repeated as needed to rotate the central gear 22 in a clockwise direction in a prescribed manner. Additionally, though not shown in FIG. 6A-6F, the same cycle or sequence may be performed in relation to the second actuation member 28 to facilitate the rotation of the central gear 22 in a counter-clockwise direction. As indicated above, when the central gear 22 is not being rotated by either of the first and second actuation members 26, 28 and thus is not engaged by either of the contact pins 44 of the pawls 42 thereof, forces could otherwise act on the drive shaft 11 in a manner which results in unwanted rotation thereof and hence the central gear 22 due to the rigid interface of the drive shaft 11 to the central gear 22 via the central hub 12. In the stepper actuator 10 of the present invention, such unwanted rotation of the central gear 22 is prevented or at least mitigated by a braking mechanism of the stepper actuator 10 which will described in more detail below.

The braking mechanism of the stepper actuator 10 of the present invention comprises a brake drum 14 which is also rigidly attached to the central hub 12, and thus rotatable concurrently with the central gear 22 as well as the drive shaft 11. As a result, the brake drum 14 is itself rotatable in either a first, clockwise direction or a second, counter-clockwise direction. In this regard, as the central gear 22 rotates in the first (clockwise) direction, the brake drum 14 also rotates in the first direction. Similarly, as the central gear 22 rotates in the second (counter-clockwise) direction, the brake drum 14 also rotates in the second direction.

The braking mechanism of the stepper actuator 10 further comprises a braking assembly 52 which is adapted to apply a frictional braking force to the brake drum 14. In this regard, the braking assembly 52 is frictionally engageable to the brake drum 14 as needed to mitigate or prevent any undesired rotation of the brake drum 14, and hence the central gear 22, central hub 12, and drive shaft It. In the stepper actuator 10, the braking mechanism is configured such that the braking assembly 52 frictionally engages the brake drum 14 when both the first and second actuation members 26, 28 are each in their retracted positions. Conversely, the braking assembly 52 disengages from the brake drum 14 when either the first or second actuation members 26, 28 is moved out of its fully retracted position, and into its corresponding actuation cycle. Thus, as either the first or second actuation members 26, 28 begins its respective actuation cycle, the braking force otherwise applied to the brake drum 14 by the braking assembly 52 to prevent any undesirable rotation of the central gear 22 and hence the drive shaft 11 is removed.

The brake drum 14 defines an annular, peripheral brake drum wall 16. The brake drum wall 16 has a wall thickness "T," and a wall depth "D." The wall thickness T and the wall depth D may be varied as desired by those of ordinary skill in the art. The brake drum wall 16 further defines an inner contact surface 20 of a prescribed curvature. The braking assembly 52 preferably defines an arcuate, convex braking surface 54 which is complimentary to and adapted to frictionally engage the inner contact surface 20 of the brake drum wall 16 to facilitate the application of the braking force to the brake drum 14. However, those of ordinary skill in the art will recognize that curvature of the braking surface 54 may differ from that of the inner contact surface 20 without departing from the spirit and scope of the present invention.

In the braking assembly 52 of the stepper actuator 10, the braking surface 54 is defined by a brake pad 66 of the braking assembly 52. The brake pad 66 is itself connected to the bottom end of a brake pad link 67. That end of the brake pad link 67 opposite the end having the brake pad 66 connected thereto is advanced through a complimentary opening in an elongate brake link 56. As best seen in FIGS. 1 and 2, the brake pad link 67 is maintained in pivotal engagement to the brake link 56 via the advancement of a cotter pin through the top end portion of the brake pad link 67 which is itself advanced through the brake link 56.

As best seen in FIGS. 2 and 3, the brake link 56 defines opposed first and second end portions 58, 60 which are pivotally connected to respective ones of the first and second actuation members 26, 28. More particularly, the first end portion 58 of the brake link 56 is pivotally connected to the above-described pin 35 used to pivotally connect the actuation link 30 of the first actuation member 26 to the actuation rod 32 of the corresponding actuator 27. Similarly, the second end portion 60 of the brake link 56 is pivotally connected to the pin 35 used to pivotally connect the actuation link 30 of the second actuation member 28 to the actuation rod 32 of the corresponding actuator 27. Accordingly, when the first actuation member 26 moves out of its fully retracted position and into its first actuation cycle, the brake link 56 pivots about the pin 35 extending through the actuation link 30 of the first actuation member 26. Similarly, when the second actuation member 28 moves out of its fully retracted position and into the second actuation cycle, the brake link 56 pivots about the pin 35 extending through the actuation link 30 of the second actuation member 28.

In the braking assembly 52 for the stepper actuator 10, when both the first and second actuation members 26, 28 are in their retracted positions, the brake link 56 is disposed in a primary, braking position. When the brake link 56 is in its primary position, the brake pad 66, and in particular the braking surface 54 defined thereby, is disposed in frictional engagement with the inner contact surface 20 defined by the peripheral brake drum wall 16 of the brake drum 14. As a result, a frictional braking force is applied by the brake pad 66 to the brake drum 14 when the brake link 56 is in its primary position, thus preventing any undesired rotation of the central gear 22. When either of the first and second actuation members 26, 28 begins to move through its corresponding actuation cycle by moving from its retracted position, the brake link 56 of the braking assembly 52 is moved from its primary position. As the brake link 56 is moved from its primary position, the brake pad 66, and in particular the braking surface 54 defined thereby, is moved out of frictional engagement with the inner contact surface 20 defined by the peripheral brake drum wall 16 of the brake drum 14. As a result, no braking force is applied by the brake pad 66 to the brake drum 14 when the brake link 56 is moved from its primary position. Thus, as will be recognized, the movement of either the first or second actuation members 26, 28 through its corresponding actuation cycle as occurs when either of the first and second actuation members 26, 28 engages and incrementally rotates the central gear 22 will eliminate the frictional, braking contact between the brake pad 66 and the brake drum 14 due to the resultant movement of the brake pad 66 out of contact with the brake drum 14. As a result, neither of the first and second actuation members 26, 28 has to overcome the braking force applied by the brake pad 66 to brake drum 14 when being used to incrementally rotate the central gear 22 in either the clockwise or counter-clockwise directions.

As indicated above, the first and second actuation members 26, 28 will only be actuated one at a time, and never concurrently. In this regard, as also explained above, the movement of only one of the first and second actuation members 26, 28 from its retracted position into its corresponding actuation cycle is all that is needed to facilitate the movement of the brake link 56 from its primary position, and thus the cessation of the braking force applied by the brake pad 66 to the brake drum 14. When both the first and second actuation members 26, 28 are in their fully retracted positions, the brake link 56 is moved back into its primary position, thus causing the brake pad 66 to once again frictionally engage the brake drum 14, thus applying the braking force to the brake drum 14 to prevent any unwanted rotation thereof, and hence the central gear 22, central hub 12 and drive shaft 11.

In the stepper actuator 10, the central hub 12, central gear 22 and brake drum 14 are each concurrently rotatable about a primary rotational axis A. It is contemplated that the diameter of the brake drum 14 may be increased as needed to facilitate a corresponding increase in the torque created by the braking force applied by the brake pad 66 to the brake drum 14, such torque being equal to the product of the radius of the brake drum 14 and the magnitude of the applied braking force. As a result, by increasing the diameter of the brake drum 14, the torque may also be increased. Consequently, it may be desirable to form the brake drum 14 to have a diameter that is greater than the maximum diameter of the central gear 22.

Although the stepper actuator 10 of the present invention is typically operated under automated control through the selective actuation of either of the above-described actuators 27, it is contemplated that either the first actuation member 26 or the second actuation member 28 may be manually actuated in the event the automated control fails (e.g., a loss of power). Therefore, in accordance with another aspect of the present invention, there is provided a manual actuation assembly which may be used to manually operate or actuate either of the first and second actuation members 26, 28. The manual actuation assembly comprises a pair of link members 70, each of which has an end portion pivotally connected to a respective one of the above-described pins 35. The end portion of each link member 70 opposite that pivotally connected to a respective pin 35 is itself pivotally connected to one end of a link member 68. Each of the link members 68 is in turn attached to one end of a shaft 69. The shafts 69 are each rotatably connected to a base plate 80 of the stepper actuator 10 via a bearing member, and each include a reduced diameter engagement portion 82 which protrudes from an exterior surface of the base plate 80. The engagement portion 82 of each shaft 69 defines a notch which is adapted to accommodate one end of an elongate, manual actuation lever 78. The actuation lever 78 is of a preferred length L.

In the stepper actuator 10, each shaft 69 is rotatable about an axis A' defined thereby upon the cooperative engagement of the manual actuation lever 78 thereto. In this regard, the rotation of the shaft 69 cooperatively engaged to the first actuation member 26 by the corresponding link members 68, 70 may be used to facilitate the manual actuation of the first actuation member 26 through its actuation cycle. Similarly, the cooperative engagement of the actuation lever 78 to the engagement portion 82 of the control shaft 69 coupled to the second actuation member 28 by the corresponding link members 68, 70 and subsequent rotation of the actuation lever 78 may be used to facilitate the manual actuation of the second actuation member 28 through its actuation cycle. As will be recognized, the length L of the actuation lever 78 may be increased as needed to increase the level of torque which is applied to the engagement portions 82 of the shafts 69 to facilitate the manual actuation of either of the first and second actuation members 26, 28.

Figure 8:
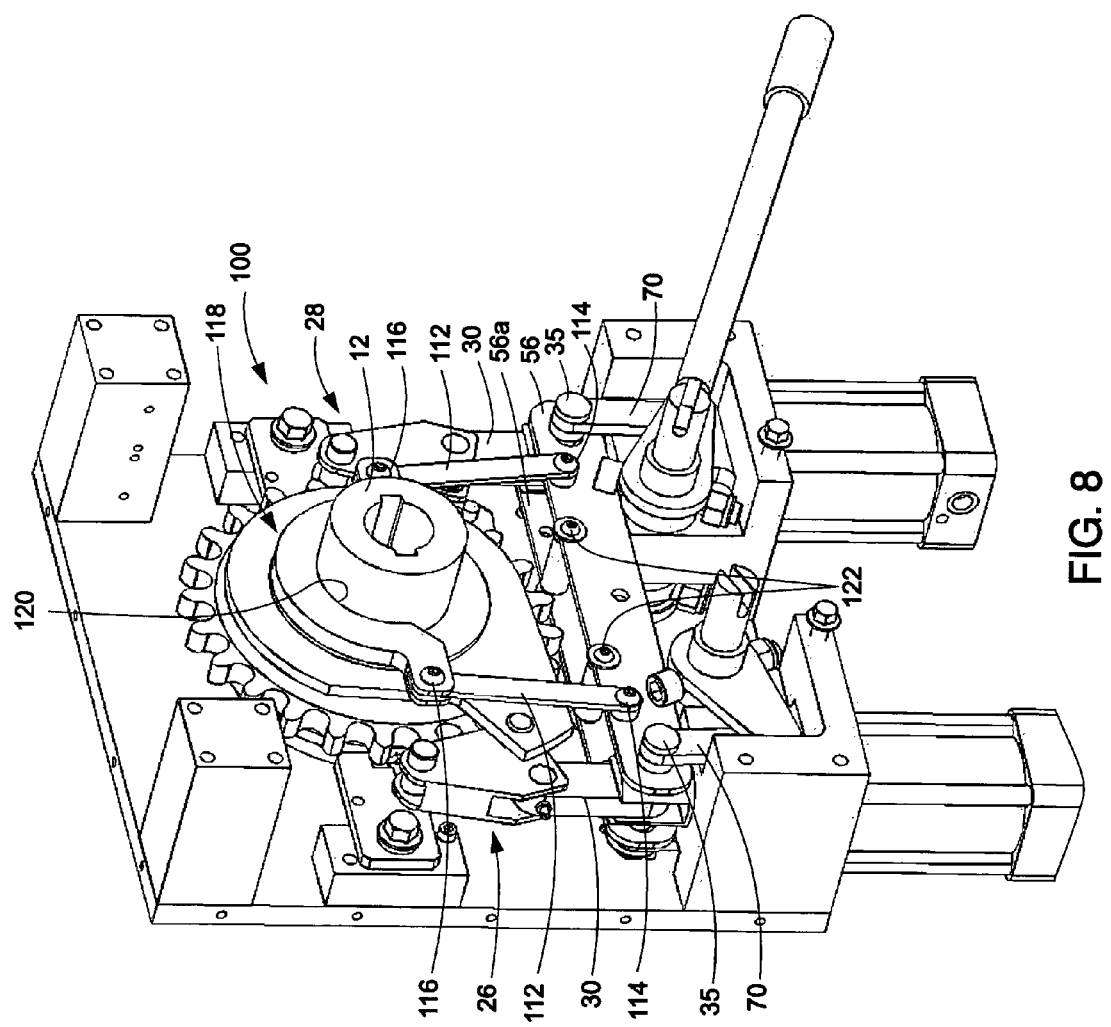
FIG. 8 is a top perspective view of a stepper actuator constructed in accordance with a second embodiment of the present invention, illustrating the braking mechanism thereof in an engaged position.

Referring now to FIG. 8, there is shown, a stepper actuator 100 constructed in accordance with a second embodiment of the present invention. Many of the structural and functional attributes of the stepper actuator 100 are identical to those described above in relation to the stepper actuator 10 of the first embodiment. Accordingly, only the distinctions between the stepper actuators 10, 100 will be discussed below.

The primary distinction between the stepper actuators 10, 100 lies in the substitution of the braking mechanism of the stepper actuator 10 with an alternatively configured braking mechanism in the stepper actuator 100. More particularly, in the stepper actuator 100, the brake drum 14 and braking assembly 52 (comprising the brake link 56, brake pad 66 and brake pad link 67) of the stepper actuator 10 are completely eliminated and substituted with an alternative braking mechanism which is adapted to selectively exert a frictional braking force on the central hub 12. In the stepper actuator 100, the alternative braking mechanism comprises an identically configured pair of elongate brake struts 112, each of which has one end pivotally connected to the brake link 56 by a pivot pin 114. The opposite end of each brake strut 112 is pivotally connected by a pivot pin 116 to a locking collar 118. It should be noted that in FIG. 8, the bearing member 71 clearly depicted in FIG. 1 as being attached to the central hub 12 is removed for purposes of clearly depicting the locking collar 118. The locking collar 118 has a generally semi-circular configuration, and defines an arcuate, concave engagement surface 120 which spans approximately 180°. The contour or radius of the engagement surface 120 is preferably complimentary to that of the outer surface of the central hub 12 to allow the entirety of the engagement surface 120 to abut the central hub 12 when the locking collar 120 is moved or actuated to its engaged or braking position in a manner which will be described in more detail below. In FIG. 8, the locking collar 118 is shown in its engaged, braking position.

In the stepper actuator 10 of the first embodiment shown in FIG. 1, the braking mechanism thereof is pivotally connected to the brake link 56. In the stepper actuator 100, the structural integrity of the brake link 56 is enhanced by the attachment thereof to a supplemental brake link 56a which is virtually identical to the brake link 56. As seen in FIG. 8, the brake links 56, 56a are arranged in spaced, generally parallel relation to each other, with the direct attachment of the brake link 56 to the brake link 56a being facilitated by a pair of fasteners 122 which extend through respective ones of a pair of tubular bosses extending between the brake links 56, 56a. The brake link 56a is further pivotally connected to the pins 35 used to pivotally connect the brake link 56 to the actuation links 30 of the first and second actuation members 26, 28 and to the link members 70 of the manual actuation assembly for the stepper actuator 100. Sufficient clearance space for the supplemental brake link 56a is provided as a result of the absence of the previously described brake drum 14 and braking assembly 52 in the stepper actuator 100.

In the braking mechanism for the stepper actuator 100, when both the first and second actuation members 26, 28 are in their fully retracted positions, the brake links 56, 56a are each disposed in a primary, braking position. When the brake links 56, 56a are each in the primary position, a tensile force is exerted on the brake struts 112, which in turn causes the engagement surface 120 defined by the locking collar 118 to be disposed in frictional engagement with the central hub 12, thus resulting in a frictional braking force being applied by the locking collar 120 to the central hub 12 and hence the central gear 22. Conversely, when either of the first and second actuation members 26, 28 begins to move through its corresponding actuation cycle by moving from its retracted position, the brake links 56, 56a are moved from the primary position. As the brake links 56, 56a are moved from the primary position, the locking collar 118, and in particular the engagement surface 120 defined thereby, is moved out of frictional engagement with the central hub 12. More particularly, the pivotal movement of the brake links 56, 56a toward the central hub 12 pushes the brake struts 112 in a manner effectuating the separation of the engagement surface 120 of the locking collar 118 from the outer surface of the central hub 12. As a result, no braking force is applied to the central hub 12, thus allowing the central gear 22 attached to the central hub 12 to freely rotate. Thus, the movement of either the first or second actuation members 26, 28 through its corresponding actuation cycle as occurs when either of the first and second actuation members 26, 28 engages and incrementally rotates the central gear 22 will eliminate the frictional, braking contact between the locking collar 118 and the central hub 12. As a result, neither of the first and second actuation members 26, 28 has to overcome the braking force applied by the locking collar 118 to the central hub 12 when being used to incrementally rotate the central gear 22 in either a clockwise or counter-clockwise direction.

As indicated above in relation to the stepper actuator 10, the first and second actuation members 26, 28 of the stepper actuator 100 will only be actuated one at a time, and never concurrently. As a result, the movement of only one of the first and second actuation members 26, 28 from its retracted position into its corresponding actuation cycle is all that is needed to facilitate the movement of the brake links 56, 56a from the primary position, and thus the cessation of the braking force applied by the locking collar 118 to the central hub 12. When both the first and second actuation members 26, 28 are in their fully retracted positions, the brake links 56, 56a are moved back into the primary position, thus causing the engagement surface 120 of the locking collar 118 to once again frictionally engage the central hub 12, thus applying the braking force to the central hub 12 to mitigate any unwanted rotation thereof and hence the central gear 22 and drive shaft 11.

Figure 9:
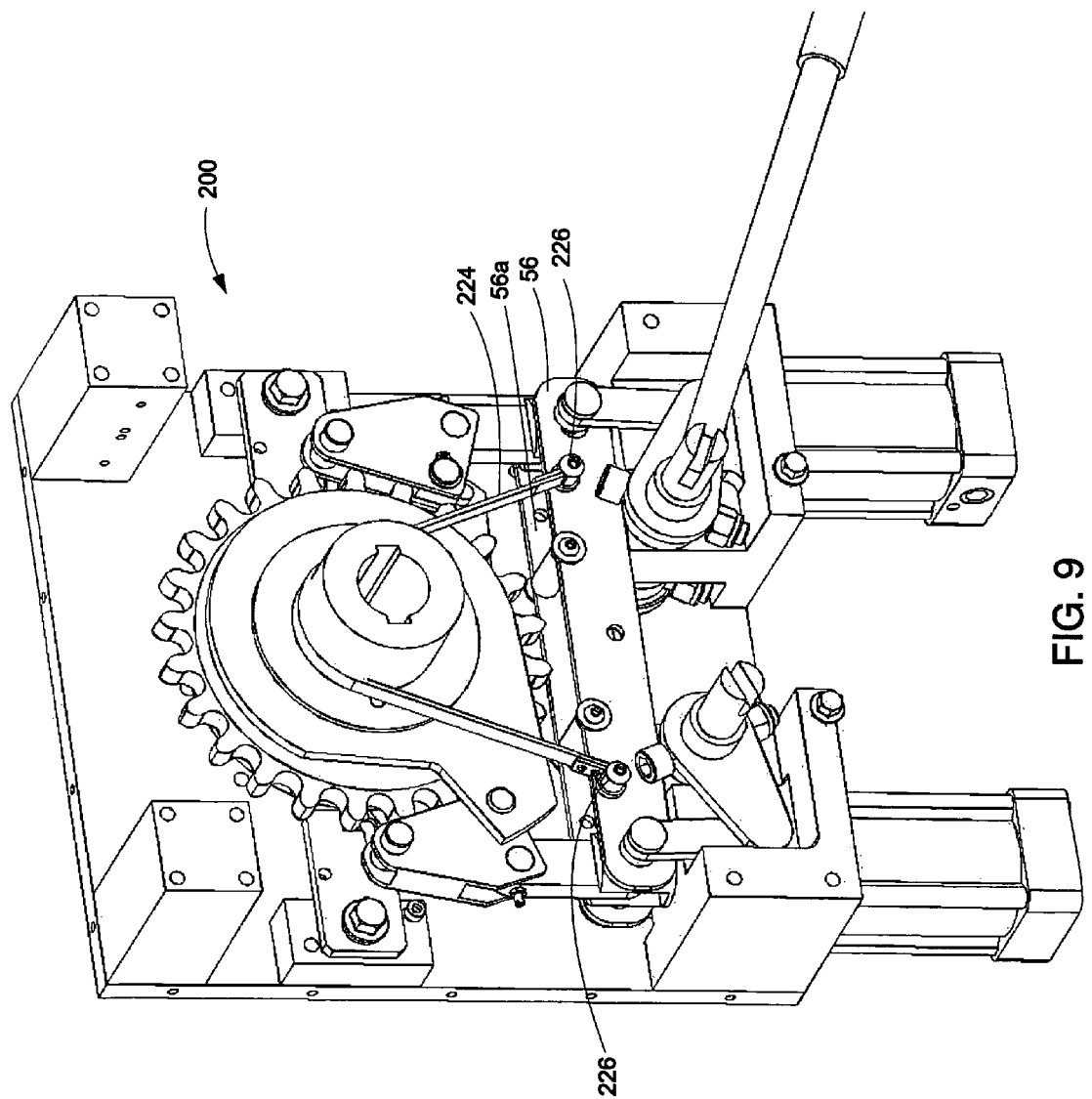
FIG. 9 is a top perspective view of a stepper actuator constructed in accordance with a third embodiment of the present invention, illustrating the braking mechanism thereof in an engaged position.

Referring now to FIG. 9, there is shown a stepper actuator 200 constructed in accordance with a third embodiment of the present invention. Many of the structural and functional attributes of the stepper actuator 200 are identical to those described above in relation to the stepper actuator 100 of the second embodiment. Accordingly, only the distinctions between the stepper actuators 100, 200 will be discussed below.

The primary distinction between the stepper actuators 100, 200 lies in the substitution of the braking mechanism of the stepper actuator 100 with an alternatively configured braking mechanism in the stepper actuator 200. More particularly, in the stepper actuator 200, the above-described brake struts 112 and locking collar 118 are eliminated, and substituted with an elongate, flexible brake belt 224. As seen in FIG. 9, the opposed ends of the brake belt 224 are connected to the brake link 54 by a pair of fasteners 226. In FIG. 9, the brake belt 224 is shown in its engaged, braking position.

In the braking mechanism for the stepper actuator 200, when both the first and second actuation members 26, 28 are in their fully retracted positions, the brake links 56, 56a are each disposed in a primary, braking position. When the brake links 56, 56a are each in the primary position, a tensile force is exerted on the brake belt 224, which in turn causes the brake belt 224 to be disposed in frictional engagement with the central hub 12, thus resulting in a frictional braking force being applied by the brake belt 224 to the central hub 112 and hence the central gear 22. Conversely, when either of the first and second actuation members 26, 28 begins to move through its corresponding actuation cycle by moving from its retracted position, the brake links 56, 56a are moved from the primary position. As the brake links 56, 56a are moved from the primary position, the brake belt 224 is moved out of frictional engagement with the central hub 12. As a result, no braking force is applied to the central hub 12, thus allowing the central gear 22 attached to the central hub 12 to freely rotate. Thus, the movement of either the first or second actuation members 26, 28 through its corresponding actuation cycle as occurs when either of the first and second actuation members 26, 28 engages and incrementally rotates the central gear 22 will eliminate the frictional, braking contact between the brake belt 224 and the central hub 12. As a result, neither of the first and second actuation members 26, 28 has to overcome the braking force applied by the brake belt 224 to the central hub 12 when being used to incrementally rotate the central gear 22 in either a clockwise or counter-clockwise direction.

As indicated above in relation to the stepper actuator 10, the first and second actuation members 26, 28 of the stepper actuator 100 will only be actuated one at a time, and never concurrently. As a result, the movement of only one of the first and second actuation members 26, 28 from its retracted position into its corresponding actuation cycle is all that is needed to facilitate the movement of the brake links 56, 56a from the primary position, and thus the cessation of the braking force applied by the brake belt 224 to the central hub 12. When both the first and second actuation members 26, 28 are in their fully retracted positions, the brake links 56, 56a are moved back into the primary position, thus causing the brake belt 224 to once again frictionally engage the central hub 12, thus applying the braking force to the central hub 12 to mitigate any unwanted rotation thereof and hence the central gear 22 and drive shaft 11.

Figure 10:
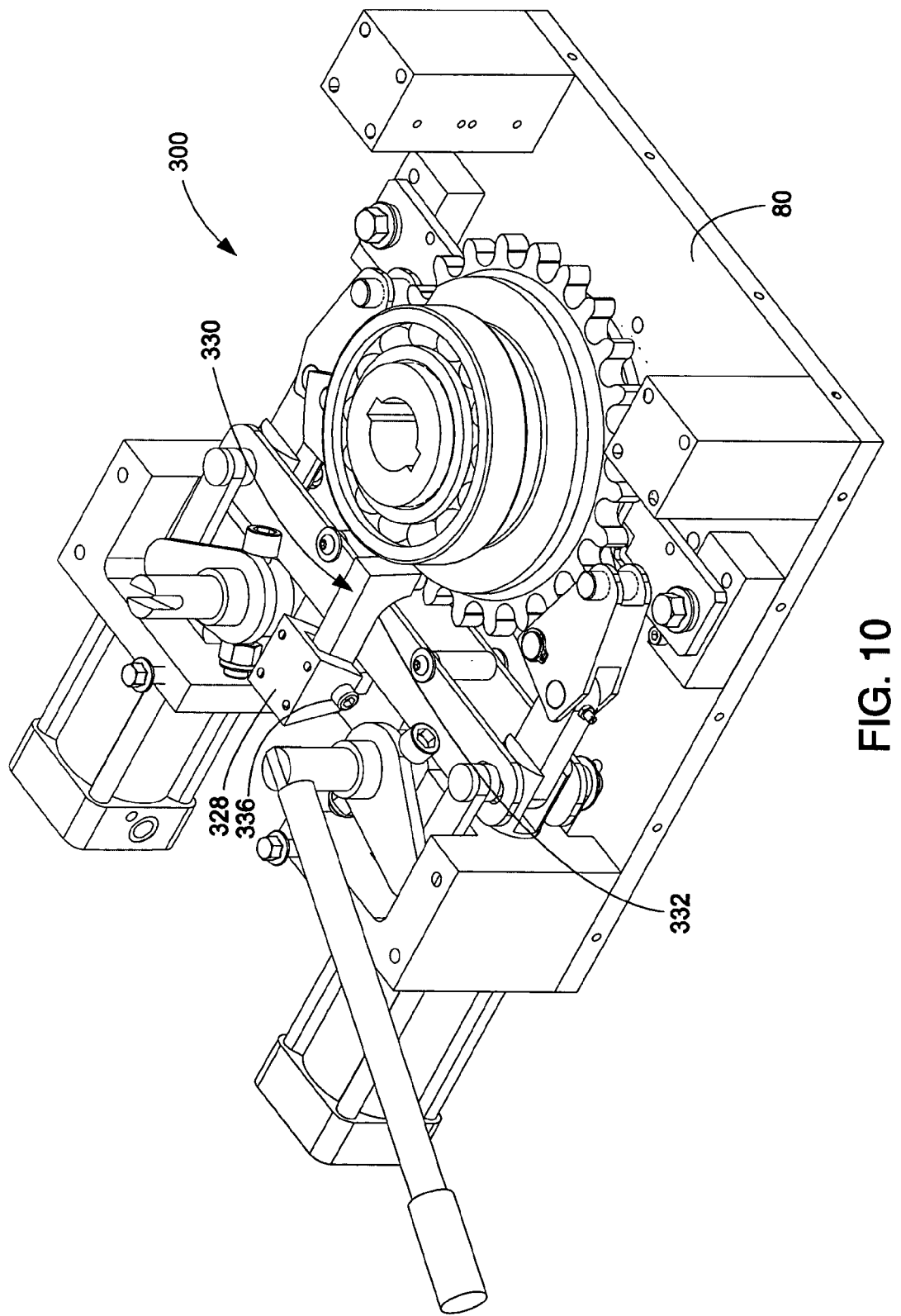
FIG. 10 is a top perspective view of a stepper actuator constructed in accordance with a fourth embodiment of the present invention, illustrating the braking mechanism thereof in an engaged position.
Figure 11:
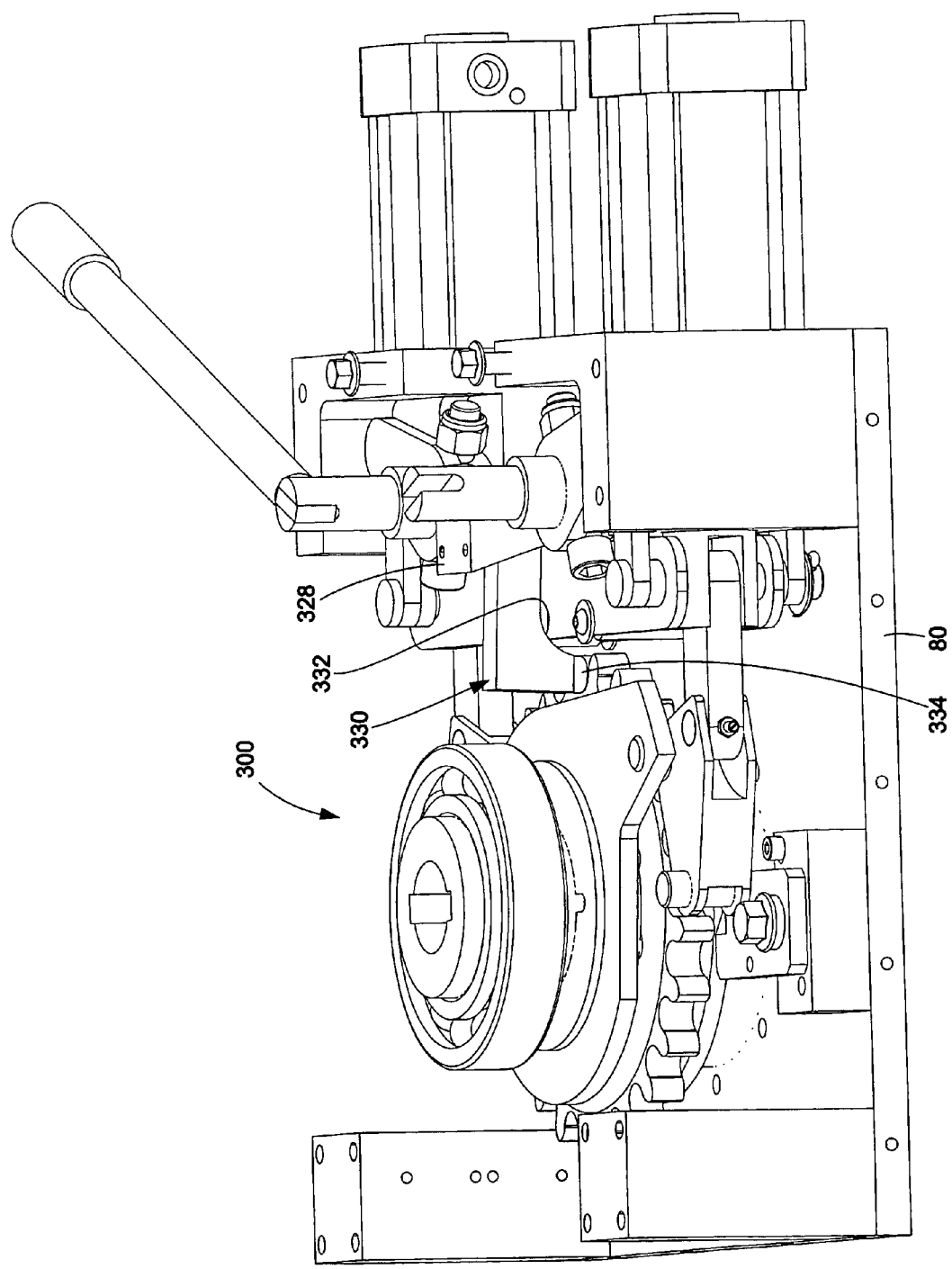
FIG. 11 is a side perspective view of the stepper actuator shown in FIG. 10, illustrating the braking mechanism thereof in a disengaged position.

Referring now to FIGS. 10 and 11, there is shown a stepper actuator 300 constructed in accordance with a fourth embodiment of the present invention. Many of the structural and functional attributes of the stepper actuator 300 are identical to those described above in relation to the stepper actuator 200 of the third embodiment. Accordingly, only the distinctions between the stepper actuators 200, 300 will be discussed below.

In the stepper actuator 300, the brake belt 224 described above in relation to the stepper actuator 200 is eliminated, and substituted with a braking mechanism comprising a brake housing 328 which is attached to and protrudes upwardly from the interior surface of the base plate 80 of the stepper actuator 400. Pivotally connected to and partially residing within the brake housing 328 is an elongate brake arm 330. As best seen in FIG. 10, the brake arm 330 has a generally L-shaped configuration, and defines an arcuate, generally concave engagement surface 332. In addition to the defining the engagement surface 332, the brake arm 330 defines a reduced width distal end portion 334. The end portion 334 of the brake arm 330 is specifically sized so as to be advanceable between an adjacent pair of the gear teeth 24 of the central gear 22. The proximal end portion of the brake arm 330 opposite the distal end portion 334 is advanced into and pivotally connected to the brake housing 328 by a pivot pin 336.

In the braking mechanism for the stepper actuator 300, when both the first and second actuation members 26, 28 are in their fully retracted positions, the brake links 56, 56a are each disposed in a primary, braking position. When the brake links 56, 56a are each in the primary position, the brake arm assumes the engaged position shown in FIG. 10 wherein the end portion 334 of the brake arm 330 is advanced between an adjacent pair of gear teeth 24 of the central gear 22. As will be recognized, the advancement of the end portion 334 between an adjacent pair of gear teeth 24 effectively prevents any rotation of the central gear 22. Conversely, when either of the first and second actuation members 26, 28 begins to move through its corresponding actuation cycle by moving from its retracted position, the brake links 56, 56a are moved from the primary position. More particularly, the pivotal movement of the brake links 56, 56a toward the central hub 12 causes the brake link 56 to act against the engagement surface 332 of the brake arm 330 in a manner pushes the brake arm 330 upwardly to the disengaged position shown in FIG. 11, which in turn effectuates the removal of the end portion 334 of the brake arm 330 from between an adjacent pair of the gear teeth 24. As a result, the central gear 22 is allowed to freely rotate. Thus, the movement of either the first or second actuation members 26, 28 through its corresponding actuation cycle as occurs when either of the first and second actuation members 26, 28 engages and incrementally rotates the central gear 22 will eliminate the braking contact between the brake arm 330 and the central gear 22. As a result, neither of the first and second actuation members 26, 28 has to overcome the braking force applied by the brake arm 330 to the central gear 22 when being used to incrementally rotate the central gear 22 in either a clockwise or counter-clockwise direction.

As indicated above in relation to the stepper actuator 10, the first and second actuation members 26, 28 of the stepper actuator 300 will only be actuated one at a time, and never concurrently. As a result, the movement of only one of the first and second actuation members 26, 28 from its retracted position into its corresponding actuation cycle is all that is needed to facilitate the movement of the brake links 56, 56a from the primary position, and thus the cessation of the braking force applied by the brake arm 330 to the central gear 22. When both the first and second actuation members 26, 28 are in their fully retracted positions, the brake links 56, 56a are moved back into the primary position, thus causing the brake arm 330 to once again engage the central gear 22 in the aforementioned manner, thus mitigating any unwanted rotation thereof.

Figure 12:
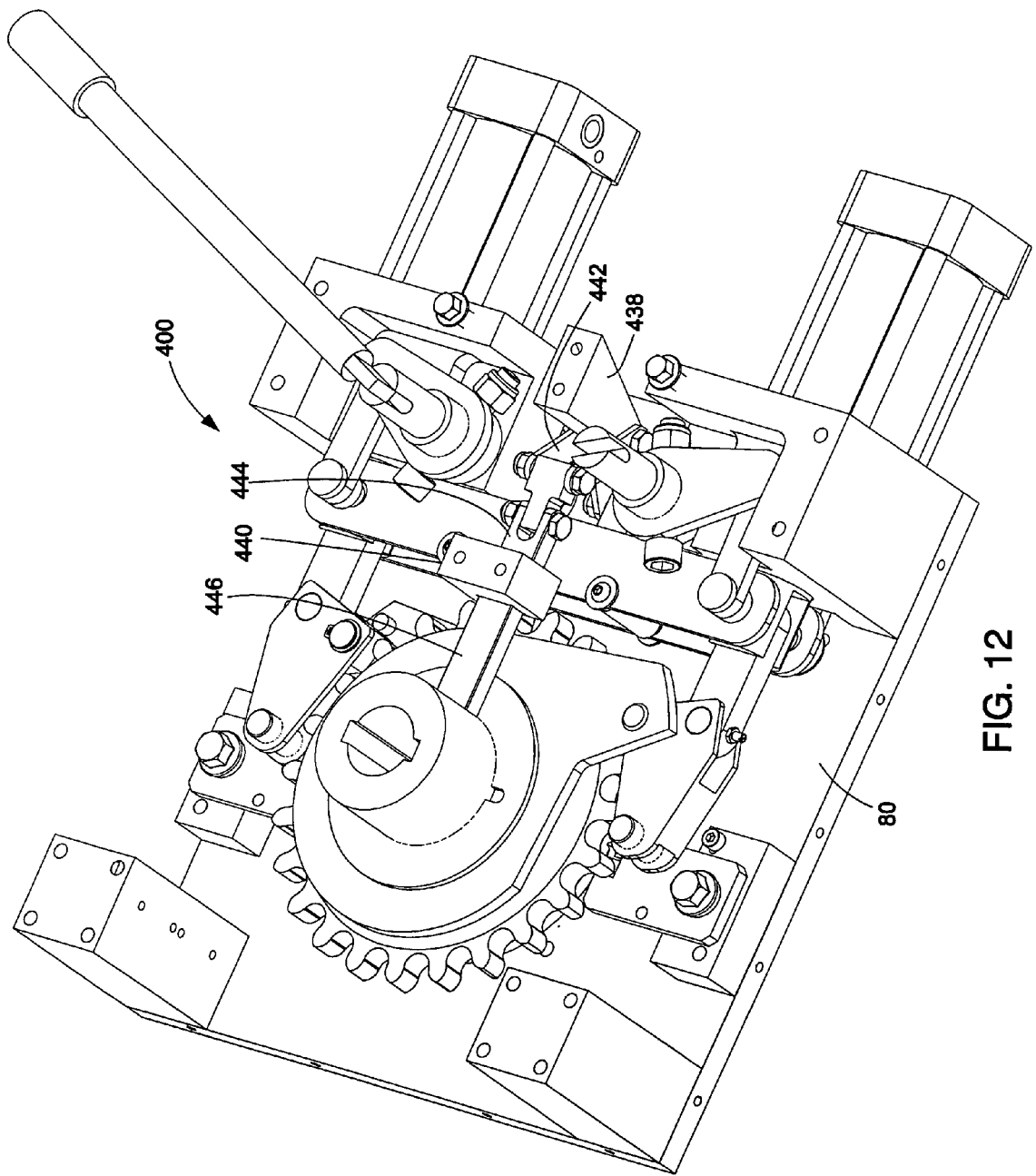
FIG. 12 is a top perspective view of a stepper actuator constructed in accordance with a fifth embodiment of the present invention, illustrating the braking mechanism thereof in an engaged position.
Figure 13:
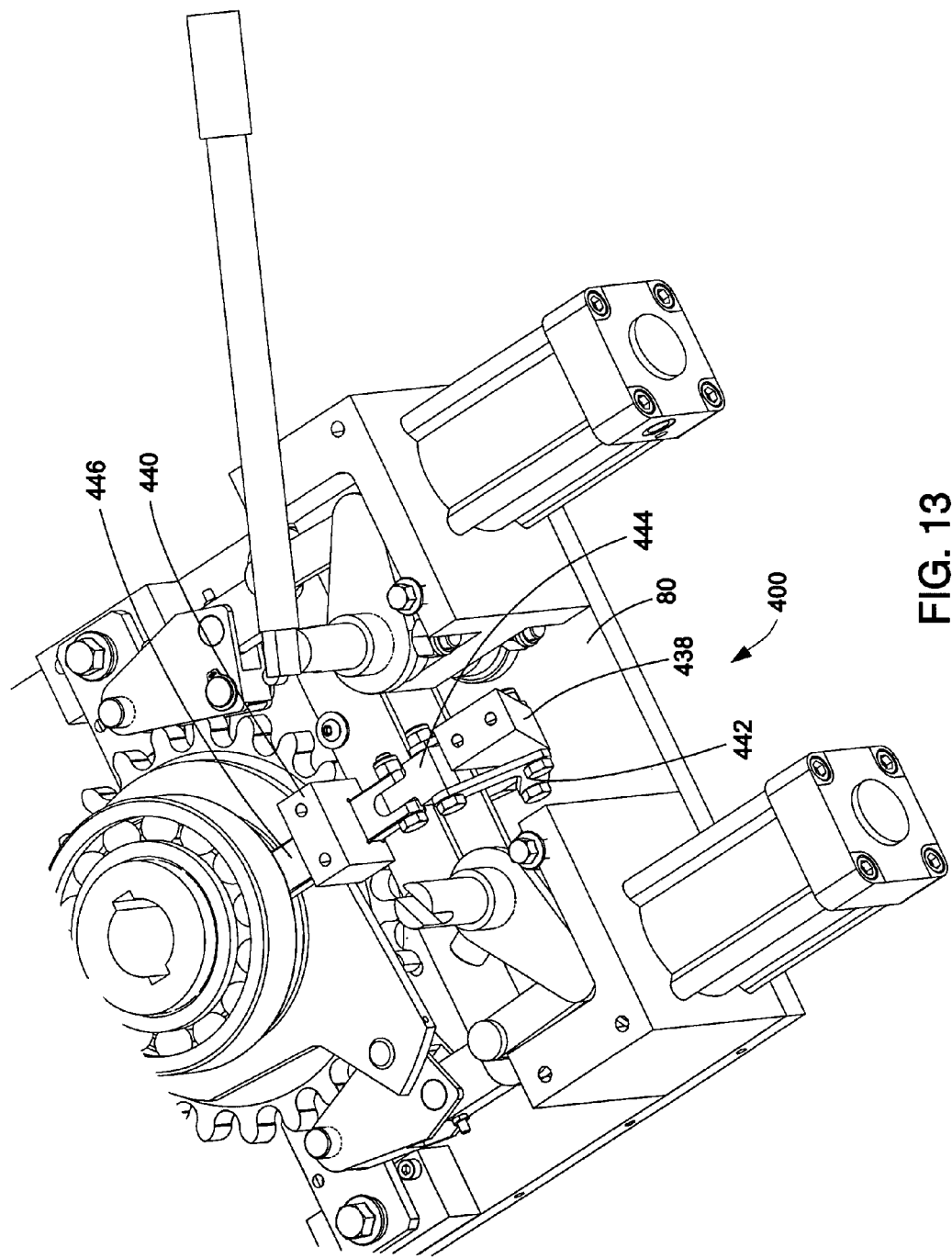
FIG. 13 is a side perspective view of the stepper actuator shown in FIG. 12, illustrating the braking mechanism thereof in an engaged position.

Referring now to FIGS. 12 and 13, there is shown a stepper actuator 400 constructed in accordance with a fifth embodiment of the present invention. Many of the structural and functional attributes of the stepper actuator 400 are identical to those described above in relation to the stepper actuator 300 of the fourth embodiment. Accordingly, only the distinctions between the stepper actuators 300, 400 will be discussed below.

In the stepper actuator 400, the brake housing 328 and the brake arm 330 described above in relation to the stepper actuator 300 are eliminated, and substituted with a braking mechanism comprising a support block 438 which is attached to and protrudes upwardly from the interior surface of the base plate 80 of the stepper actuator 400. Also attached to and protruding upwardly from the interior surface of the base plate 80 is a guide block 440. Pivotally connected to the support block 438 is a generally V-shaped actuation link 442. As best seen in FIG. 13, pivotally connected to that distal end defined by the actuation link 442 which is disposed furthest from the base plate 80 is an adapter link 444. Pivotally connected to an end portion of the adapter link 444 opposite the end portion pivotally connected to the actuation link 442 is one end of an elongate brake bar 446. The brake bar 446 is maintained in generally parallel relation to the base plate 80 by the slideable advancement thereof through a complimentary opening defined by the guide block 440. The distal end of the brake bar 446 is sized and configured to be selectively brought into abutting, frictional engagement to the outer surface of the central hub 12. In FIGS. 12 and 13, the brake bar 446 is shown in its engaged, braking position. The distal end of the actuation link 442 opposite the end which is pivotally connected to the adapter link 444 is itself pivotally connected to the brake link 56a described above with particularity in relation to the stepper actuator 100 of the second embodiment.

In the braking mechanism for the stepper actuator 400, when both the first and second actuation members 26, 28 are in their fully retracted positions, the brake links 56, 56a are each disposed in a primary, braking position. When the brake links 56, 56a are each in the primary position, the brake bar 446 assumes the position shown in FIGS. 12 and 13 wherein the distal end is in abutting, frictional contact with the outer surface of the central hub 12. As will be recognized, the engagement between the distal end of the brake bar 446 and the central hub 12 effectively prevents any rotation of the central gear 22. Conversely, when either of the first or second actuation members 26, 28 begins to move through its corresponding actuation cycle by moving from its retracted position, the brake links 56, 56a are moved from the primary position. More particularly, the pivotal movement of the brake links 56, 56a toward the central hub 12 causes the brake link 56a to act against the actuation link 442 in a manner facilitating the clockwise rotation thereof when viewed from the perspective shown in FIG. 12. Such clockwise rotation of the actuation link 442 effectively draws the adapter link 444 and hence the brake bar 446 toward the support block 438, thereby separating or disengaging the distal end of the brake bar 446 from the central hub 12, and allowing the central gear 22 to freely rotate. Thus, the movement of either the first or second actuation members 26, 28 through its corresponding actuation cycle as occurs when either of the first and second actuation members 26, 28 engages and incrementally rotates the central gear 22 will eliminate the braking contact between the brake bar 446 and the central hub 12. As a result, neither of the first and second actuation members 26, 28 has to overcome the braking force applied by the brake bar 446 to the central hub 12 when being used to incrementally rotate the central gear 22 in either a clockwise or counter-clockwise direction.

Conversely, when both of the first and second actuation members 26, 28 return to their fully retracted position, thereby returning the brake links 56, 56a to the primary position, the movement of the brake links 56, 56a toward the primary position facilitates the rotation of the actuation link 442 in a counter-clockwise direction when viewed from the perspective shown in FIG. 12. Such counter-clockwise rotation of the actuation link 442 facilitates the movement of the adapter link 444 and hence the brake link 446 in a direction away from the support block 438, such movement culminating in the distal end of the brake bar 446 abutting and frictionally engaging the central hub 12, thus effectively preventing any rotation of the central gear 22.

As indicated above in relation to the stepper actuator 10, the first and second actuation members 26, 28 of the stepper actuator 400 will only be actuated one at a time, and never concurrently. As a result, the movement of only one of the first and second actuation members 26, 28 from its retracted position into its corresponding actuation cycle is all that is needed to facilitate the movement of the brake links 56, 56a from the primary position, and thus the cessation of the braking force applied by the brake bar 446 to the central hub 12. When both the first and second actuation members 26, 28 are in their fully retracted positions, the brake links 56, 56a are moved back into their primary position, thus causing the brake bar 446 to once again engage the central hub 12 in the aforementioned manner, thus preventing any unwanted rotation of the central gear 22 as indicated above.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A stepper actuator comprising:
a central gear selectively rotatable in clockwise and counter-clockwise directions;
a first actuation member selectively moveable from a retracted position through a first actuation cycle, the first actuation member including a first actuation link and a first pawl which is pivotally connected to the first actuation link and selectively movable between engaged and disengaged positions relative thereto, the first pawl being operative to releasably engage and incrementally rotate the central gear through a prescribed angular displacement in the clockwise direction when in the engaged position and upon the movement of the first actuation member through the first actuation cycle;
a second actuation member selectively moveable from a retracted position through a second actuation cycle, the second actuation member including a second actuation link and a second pawl which is pivotally connected to the second actuation link and selectively movable between engaged and disengaged positions relative thereto, the second pawl being operative to releasably engage and incrementally rotate the central gear through a prescribed angular displacement in the counter-clockwise direction when in the engaged position and upon the movement of the second actuation member through the second actuation cycle;
a brake drum cooperatively engaged to the central gear so as to be concurrently rotatable therewith; and
a braking assembly operatively coupled to the first and second actuation members, the braking assembly being frictionally engaged to the brake drum to prevent rotation of the brake drum and the central gear when the first and second actuation members are each in the retracted position, and disengaged from the brake drum when one of the first and second actuation members is moved from the retracted position into a respective one of the first and second actuation cycles.

2. The stepper actuator of claim 1 wherein the brake drum includes a peripheral brake drum wall defining an inner contact surface which is adapted to frictionally engage the braking assembly.

3. The stepper actuator of claim 2 wherein the braking assembly includes a brake pad defining an arcuate braking surface which is engageable with the inner contact surface of the brake drum wall.

4. The stepper actuator of claim 3 wherein the inner contact surface is of a first curvature and the arcuate braking surface is of a second curvature which is complimentary to the first curvature.

5. The stepper actuator of claim 3 wherein the braking assembly further includes an elongate brake link pivotally connected to and extending between the first and second actuation members, the elongate brake link being in a braking position when the first and second actuation members are each in the retracted position, the brake pad being connected to the brake link and frictionally engaged to the brake drum when the brake link is in the braking position.

6. The stepper actuator of claim 5 wherein the brake pad is pivotally connected to the brake link by a brake pad link.

7. The stepper actuator of claim 1 wherein the brake drum and the central gear are rotatable about a common axis of rotation.

8. The stepper actuator of claim 1 wherein the central gear is of a gear diameter and the brake drum is of a drum diameter which exceeds the gear diameter.

9. The stepper actuator of claim 1 further in combination with at least one manual actuation lever which is mechanically connected to one of the first and second actuation members and is operative to selectively move one of the first and second actuation members through a respective one of the first and second actuation cycles.

10. A stepper actuator comprising:
a central gear selectively rotatable in clockwise and counter-clockwise directions;
a first actuation member selectively moveable from a retracted position through a first actuation cycle, and operative to releasably engage and incrementally rotate the central gear through a prescribed angular displacement in the clockwise direction when moved through the first actuation cycle;

a second actuation member selectively moveable from a retracted position through a second actuation cycle, and operative to releasably engage and incrementally rotate the central gear through a prescribed angular displacement in the counter-clockwise direction when moved through the second actuation cycle; and a braking mechanism coupled to the first and second actuation members, the braking mechanism being cooperatively engaged to and operative to prevent rotation of the central gear when the first and second actuation members are each in the retracted position, and disengaged from the central when one of the first and second actuation members is moved from the retracted position into a respective one of the first and second actuation cycles, the braking mechanism comprising:

at least one elongate brake link pivotally connected to and extending between the first and second actuation members, the brake link being in a braking position when the first and second actuation members are each in the retracted position;

a pair of brake struts which each define opposed fist and second end portions, the first end portion of each of the brake struts being pivotally connected to the brake link; and a locking collar pivotally connected to the second end portion of each of the brake struts, the locking collar being cooperatively engaged to and operative to prevent the rotation of the central gear when the brake link is in the braking position.

11. A stepper actuator comprising:
a central gear selectively rotatable in clockwise and counter-clockwise directions;
a first actuation member selectively moveable from a retracted position through a first actuation cycle, and operative to releasably engage and incrementally rotate the central gear through a prescribed angular displacement in the clockwise direction when moved through the first actuation cycle;
a second actuation member selectively moveable from a retracted position through a second actuation cycle, and operative to releasably engage and incrementally rotate the central gear through a prescribed angular displacement in the counter-clockwise direction when moved through the second actuation cycle;
a brake drum cooperatively engaged to the central gear so as to be concurrently rotatable therewith, the brake drum including a peripheral brake drum wall defining an inner contact surface; and
a braking assembly including:
an elongate brake link pivotally connected to and extending between the first and second actuation members; and
a brake pad connected to the brake link and defining a braking surface which is selectively engageable with the inner contact surface of the brake drum wall, the brake pad being frictionally engaged to the brake drum to prevent rotation of the brake drum and the central gear when the first and second actuation members are each in the retracted position, and disengaged from the brake drum when one of the first and second actuation members is moved from the retracted position into a respective one of the first and second actuation cycles.

12. The stepper actuator of claim 11 wherein the brake pad is pivotally connected to the brake link by a brake pad link.

13. The stepper actuator of claim 11 wherein the brake drum and the central gear are rotatable about a common axis of rotation.

14. The stepper actuator of claim 11 wherein the central gear is of a gear diameter and the brake drum is of a drum diameter which exceeds the gear diameter.

15. The stepper actuator of claim 11 wherein the first and second actuation members each comprise:
an actuation link; and
a pawl pivotally connected to the actuation link, the pawl being pivotally movable between engaged and disengaged positions relative to the actuation link, and operative to releasably engage and incrementally rotate the central gear through a prescribed angular displacement when in the engaged position.

16. The stepper actuator of claim 11 further in combination with at least one manual actuation lever which is mechanically connected to one of the first and second actuation members and is operative to selectively move one of the first and second actuation members through a respective one of the first and second actuation cycles.

17. A stepper actuator comprising:
a central gear selectively rotatable in clockwise and counter-clockwise directions;
a first actuation member selectively moveable from a retracted position through a first actuation cycle, and operative to releasably engage and incrementally rotate the central gear through a prescribed angular displacement in the clockwise direction when moved through the first actuation cycle;
a second actuation member selectively moveable from a retracted position through a second actuation cycle, and operative to releasably engage and incrementally rotate the central gear through a prescribed angular displacement in the counter-clockwise direction when moved through the second actuation cycle; and
a braking mechanism coupled to the first and second actuation members, the braking mechanism being cooperatively engaged to and operative to prevent rotation of the central gear when the first and second actuation members are each in the retracted position, and disengaged from the central gear when one of the first and second actuation members is moved from the retracted position into a respective one of the first and second actuation cycles, the braking mechanism comprising:
at least one elongate brake link pivotally connected to and extending between the first and second actuation members, the brake link being in a braking position when the first and second actuation members are each in the retracted position; and
an elongate, flexible brake belt defining opposed first and second end portions which are connected to the brake link, the brake belt being cooperatively engaged to and operative to prevent the rotation of the central gear when the brake link is in the braking position.

18. A stepper actuator comprising:
a central gear selectively rotatable in clockwise and counter-clockwise directions;
a first actuation member selectively moveable from a retracted position through a first actuation cycle, and operative to releasably engage and incrementally rotate the central gear through a prescribed angular displacement in the clockwise direction when moved through the first actuation cycle;
a second actuation member selectively moveable from a retracted position through a second actuation cycle, and operative to releasably engage and incrementally rotate the central gear through a prescribed angular displacement in the counter-clockwise direction when moved through the second actuation cycle; and a braking mechanism coupled to the first and second actuation members, the braking mechanism being cooperatively engaged to and operative to prevent rotation of the central gear when the first and second actuation members are each in the retracted position, and disengaged from the central gear when one of the first and second actuation members is moved from the retracted position into a respective one of the first and second actuation cycles, the braking mechanism comprising:

at least one elongate brake link pivotally connected to and extending between the first and second actuation members, the brake link being in a braking position when the first and second actuation members are each in the retracted position;

a brake housing disposed in close proximity to the brake link; and an elongate brake arm defining a proximal end portion which is pivotally connected to the brake housing and a distal end portion which is sized to be advanceable between any adjacent pair of gear teeth defined by the central gear;

the brake link being cooperatively engageable to the brake arm in a manner wherein the distal end portion is disposed between an adjacent pair of the gear teeth when the brake link is in the braking position thus preventing rotation of the central gear, and the distal end portion of the brake arm is removed from between an adjacent pair of gear teeth when either of the first and second actuators is moved from the retracted position.

19. A stepper actuator comprising:

a central gear selectively rotatable in clockwise and counter-clockwise directions;

a first actuation member selectively moveable from a retracted position through a first actuation cycle, and operative to releasably engage and incrementally rotate the central gear through a prescribed angular displacement in the clockwise direction when moved through the first actuation cycle;

a second actuation member selectively moveable from a retracted position through a second actuation cycle, and operative to releasably engage and incrementally rotate the central gear through a prescribed angular displacement in the counter-clockwise direction when moved through the second actuation cycle; and a braking mechanism coupled to the first and second actuation members, the braking mechanism being cooperatively engaged to and operative to prevent rotation of the central gear when the first and second actuation members are each in the retracted position, and disengaged from the central gear when one of the first and second actuation members is moved from the retracted position into a respective one of the first and second actuation cycles, the braking mechanism comprising:

at least one elongate brake link pivotally connected to and extending between the first and second actuation members, the brake link being in a braking position when the first and second actuation members are each in the retracted position;

a support block disposed in close proximity to the brake link;

an actuation link pivotally connected to the support block;

an adapter link pivotally connected to the actuation link; and an elongate brake bar pivotally connected to the adapter link;

the brake link being cooperatively engaged to the brake bar in a manner wherein the brake bar is cooperatively engaged to and operative to prevent the rotation of the central gear when the brake link is in the braking position.

* * * * *